United States Patent [19]

Moriguchi et al.

[11] Patent Number: 5,687,576
[45] Date of Patent: Nov. 18, 1997

[54] WATER-EVAPORATION TYPE COOLING SYSTEM BASED ON ELECTROLYTIC REACTION AND WATER-EVAPORATION TYPE COOLING METHOD THEREFOR

[75] Inventors: Tetsuo Moriguchi; Shiro Yamauchi, both of Tokyo, Japan

[73] Assignee: Mitsubishi Denki Kabushiki Kaisha, Tokyo, Japan

[21] Appl. No.: 682,379

[22] Filed: Jul. 17, 1996

[30] Foreign Application Priority Data

| Jul. 24, 1995 | [JP] | Japan | 7-187360 |
| Nov. 15, 1995 | [JP] | Japan | 7-296951 |
| Feb. 22, 1996 | [JP] | Japan | 8-035003 |

[51] Int. Cl.$^6$ ..................................... F25D 9/00
[52] U.S. Cl. ............................ 62/56; 62/121; 62/304; 62/310
[58] Field of Search .................. 62/304, 305, 306, 62/311, 310, 121, 118, 79, 100, 56; 204/252

[56] References Cited

U.S. PATENT DOCUMENTS

| 5,122,239 | 6/1992 | McElroy et al. | 204/252 |
| 5,141,604 | 8/1992 | Ayers | 204/252 |

FOREIGN PATENT DOCUMENTS

| 61-129019 | 6/1986 | Japan . |
| 63-189758 | 8/1988 | Japan . |
| 6-154543 | 6/1994 | Japan . |

*Primary Examiner*—John M. Sollecito
*Attorney, Agent, or Firm*—Burns, Doane, Swecker & Mathis, LLP

[57] ABSTRACT

A water evaporation type cooling system equipped with a hermetically sealed housing and a solid electrolytic membrane placed to divide the hermetically sealed housing into first and second hermetically sealed spaces. Water is reservoired within the first hermetically sealed space, while a condenser is situated to communicate with the second hermetically sealed space. A direct-current voltage is applied to the solid electrolytic membrane, with the result that a water electrolytic reaction takes place on its first hermetically sealed space side surface, while a water production reaction occurs on its second hermetically sealed space side surface. Protons produced by the water electrolysis pass through the solid electrolytic membrane to contribute to a water production reaction. Steam within the first hermetically sealed space is transferred to the second hermetically sealed space whereas the oxygen within the second hermetically sealed space is shifted to the first hermetically sealed space. Thus, the humidity within the first hermetically sealed space falls to accelerate the evaporation of the water reservoired within the first hermetically sealed space, thereby inducing a temperature drop.

20 Claims, 18 Drawing Sheets

WATER-EVAPORATION TYPE COOLING SYSTEM BASED ON ELECTROLYTIC REACTION AND WATER-EVAPORATION TYPE COOLING METHOD THEREFOR

BACKGROUND OF THE INVENTION

1. [Field of the Invention]

The present invention relates to a cooling method and cooling system useful for electronic parts such as LSIs and power modules to be mounted on electronic equipment and electrical power equipment, and more particularly to a water-evaporation type cooling method and system which are designed to cause a difference in humidity between both surfaces of a film-like substance made of a solid polyelectrolyte on the basis of its electrolytic effect and to produce a cooling effect by accelerating water evaporation and steam condensation.

2. [Description of the Related Art]

As heat pumps for cooling or air-conditioning, there have been known a refrigerant compression type heat pump, an absorption type heat pump using a lithium bromide-based water as a refrigerant, and so on. In addition, there has been known an electronic type cooling method using the Peltier effect. Further, for dehumidification, for example, there have been employed an absorption type humidity conditioning apparatus which is designed to make air contact with a moisture absorption liquid such as lithium chloride to absorb steam in the air.

Apparatus using a film-like substance have been proposed by, for example, the Japanese Patent Application Laid-Open No. 6-154543 or the Japanese Patent Publication No. 2-24572.

FIG. 25 is an illustration of a structure of a steam transmission membrane (film) type dehumidifier system disclosed in the Japanese Patent Application Laid-Open No. 6-154543. This dehumidifier system is equipped with a tank 2 for storing a dehumidifying liquid 1, a ventilation flue (passage) 3 having an inlet 3a coupled to the indoor area and further having outlets 3b, 3c selectively communicating with one of the indoor area and the outdoor area in accordance with the opening and closing operations of a damper 12, a moisture absorption and emission module 5 situated within the ventilation flue 3 for discharge and reception of moisture between the dehumidifying liquid 1 within a steam transmission membrane made tube 4 and the flowing air outside the tube 4 through its steam transmission membrane, and a fan 13 for blowing air from the inlet 3a side to the moisture absorption and emission module 5. In addition, pipe lines 7 and 8 extending through a pump 6 are coupled to between both the end portions of the moisture absorption and emission modulate 5 and the tank 2, respectively, so that the dehumidifying liquid 1 within the tank 2 can be circulated to the moisture absorption and emission modulate 5 through the pump 6. Further, an electronic refrigerating device 9 is provided to make a heat exchange with the pipe line 7 to selectively heat and cool the dehumidifying liquid 1 on the Peltier effect.

In this case, the dehumidifying liquid 1 can be a lithium chloride (LiCl) aqueous solution, and the system utilizes the principle that the relative humidity of the air coming into contact therewith is maintained to a smaller value as its solution concentration increases or as its temperature drops. Further, the steam transmission membrane making up the tube 4 is made from a polyester high polymer (macromolecule) having hydroxyl groups and the like at its principal chains or side chains.

Secondly, a description will be made hereinbelow of the operation of the conventional steam transmission membrane type dehumidifier system.

First, for dehumidifying the indoor area, through a switch 10 placed at a position shown in FIG. 25, a current flows from a direct-current power source 11 to the electronic refrigerating device 9 in the positive direction. At this time, the damper 12, located at the position shown in FIG. 25, makes the outlet 3b communicate with the indoor area, with the fan 13 being driven and the pump 6 is also driven. Thus, the high-concentration dehumidifying liquid 1 is passed through the pipe line 7 under pressure by the pump 6, while being cooled by coming into contact through a radiator 14a with one side of the electric refrigerating device 9, then reaching the moisture absorption and emission module 5 in a low-temperature and high-concentration condition. The dehumidifying liquid 1 fed in the moisture absorption and emission module 5 flows within the tube 4 and absorbs, through the steam transmission membrane constituting the wall of the tube 4, the moisture contained in the indoor air flowing within the ventilation flue 3 due to the fan 13 on the basis of the steam pressure difference. The air from which the moisture is taken is returned through the outlet 3b into the indoor area. Such a circulation of the air within the indoor area allows the dehumidification within the indoor area. On the other hand, the dehumidifying liquid 1 which has taken or absorbed the moisture shows a low concentration and passes through the pipe line 8 to return into the tank 2, thus lowering the concentration of the dehumidifying liquid 1 within the tank 2.

For dehydration made from the dehumidifying liquid 1 with a saturated absorbing power, the switch 10 is changed over in a direction indicated by an arrow in the illustration so that a current flows from the direct-current power source 11 to the electronic refrigerating device 9 in the opposite direction. At this time, the damper 12 is switched in a direction indicated by an arrow in the illustration to allow the outlet 3c to communicate with the outdoor area, with the fan 13 being driven and the pump 6 being driven. Whereupon, the dehumidifying liquid 1 with a low concentration within the tank 2 is passed under pressure through the pipe line 7 by the pump 6, while coming into contact through the radiator 14a with one surface of the electronic refrigerating device 9 heating on the Peltier effect. After thus heated, the dehumidifying liquid 1 shows a high concentration and reaches the moisture absorption and emission module 5. The moisture contained in the dehumidifying liquid 1 sent to the moisture absorption and emission module 5 flows within the tube 4 while, due to the steam pressure difference, being discharged through the steam transmission membrane organizing the pipe wall of the tube 4 into the air flowing within the ventilation flue 3. Further, the air with the given moisture is discharged through the outlet 3c toward the outdoor area. With the moisture discharged, the dehumidifying liquid 1 shows a high concentration and returns through the pipe line 8 into the tank 2. Such operations repeated allow the dehumidification of the indoor air and the regeneration of the dehumidifying liquid 1.

FIG. 26 is an illustration of a construction of an absorption type temperature regenerator using a porous membrane disclosed in the Japanese Patent Application Laid-Open No. 2-24572. This absorption type temperature regenerator includes a dilution unit 15 divided into an absorption chamber 15a and an evaporation chamber 15b with a hydrophobic porous membrane 19 which permits selective transmission of only steam being interposed therebetween. Also included in the temperature regenerator are a concentration unit 16 divided into a concentration tank 16a for concentrating an absorption liquid and a condensation tank (condenser) 16b with a similar hydrophobic porous membrane 19 interposed therebetween. In addition, the temperature regenerator is provided with circulating pumps 17a, 17b for circulating the absorption liquid and water, and a regeneration heat exchanger 18.

Secondly, a description will be made hereinbelow of the prior absorption type temperature regenerator. Here, as the absorption liquid there is used a chemical material such as a lithium bromide aqueous solution with a low steam pressure property, which material is circulated between the absorption chamber 15a and the concentration tank 16a. The steam 21 evaporated and generated within the evaporation chamber 15b penetrates or permeates the hydrophobic porous membrane 19 and enters the absorption chamber 15a and then is absorbed into the absorption liquid. The absorption liquid diluted by absorbing the moisture is delivered into the concentration tank 16a. After heated and boiled in the concentration tank 16a, the absorption liquid is returned as a concentrated liquid into the absorption chamber 15a to contribute to the steam absorption.

On the other hand, the water whose temperature falls due to the evaporation within the evaporation chamber 15b is used as a source of cooling. In addition, the steam 21 generated with the absorption liquid diluted in the concentration tank 16a being heated and boiled penetrates the hydrophobic porous membrane 19 into the condensation tank 16b. In the condensation tank 16b, the steam 21 is condensed to turn into water which in turn, is returned to the evaporation chamber 15b. An absorption liquid such as a lithium bromide aqueous solution has a low water vapor partial pressure. Therefore, the absorption liquid does not evaporate and only the water within the evaporation chamber 15b evaporates even when they are at the same temperature. The water within the evaporation chamber 15b evaporates by absorbing the latent heat of evaporization and the temperature of the water decreases.

On the other hand, when the absorption liquid absorbs the steam 21 entered from the evaporation chamber 15b into the absorption chamber 15a via the hydrophobic porous membrane 19, the absorption liquid becomes feverigh (generates heat) by the heat of condensation and the heat of dilution and the temperature of the absorption liquid rises.

For example, when the system supplies the evaporation chamber 15b with the heat so that the temperature of the evaporation chamber 15b may not fall, the absorption chamber 15a supplies a hot heat which is higher than the supplied heat.

On the other hand, when the system supplies the absorption chamber 15a with the heat of which temperature is lower than the absorption chamber 15a so that the temperature of the absorption chamber 15a may not rise, the evaporation chamber 15b supplies a cold heat of which temperature is lower than the supplied heat.

The system is operated so as to attain at least one of the cold heat and the hot heat in this way.

If the absorption liquid enters the water line comprising the evaporation chamber 15b and the condensation chamber 16b, particularly the evaporation chamber 15b, the absorption liquid hinders the evaporation of water, with the result that the function of the heat pump deteriorates. This hydrophobic porous membrane 19 has a plurality of through-holes 19a of a diameter of 1 to 5 μm, with the result that even if the steam 21 containing liquid droplets 20 approaches the hydrophobic porous membrane 19, the the liquid droplets 20 can not come into contact with the membrane 19 because of its hydrophobic property, thus forming a boundary as indicated by a dotted line in FIG. 27. Accordingly, the hydrophobic porous membrane 19 exhibits a gas and liquid separation function whereby only the steam 21 selectively permeates without the transmission of the liquid droplets 20. Due to this function, the absorption liquid can be prevented from passing from the absorption chamber 15a through the hydrophobic porous membrane 19 into the evaporation chamber 15b, thus eliminating the above-mentioned problem.

Recently, with progression of semiconductor technology, electronic equipment and power equipment including power modules and electronic parts represented by LSI have come into widespread use. In practical use, various limitations are imposed on semiconductor devices, with temperature representing one example. For this reason, for instance as shown in FIG. 28, for heat dissipation a cooling means is provided to transmit the heat, generated from electronic parts 23 on electronic substrates 22, through heat pipes 24 up to a heat radiator 25. Moreover, there may be a need for electronic equipment or semiconductor sensors to be placed in a surrounding where the temperature is higher than an allowable temperature before their operations. However, the cooling means shown in FIG. 28 can not cool the electronic equipment or semiconductor sensors to below the ambient temperature, and hence there is a need to provide a small-scale or microscopic cooler which enables the electronic parts to be cooled on the electronic substrates 22. What's more, in most cases, the cooler is required to be of the small-sized, resting and noiseless type that has a high efficiency and is free from maintenance. In addition, the prior steam transmission membrane type dehumidifier system is made up of a number of components including the tank 2 for storing the moisture absorption liquid 1, the ventilation flue 3, the moisture absorption and emission module 5, the pump 6 for delivering the moisture absorption liquid 1 under pressure, pipe lines 7, 8, and the electronic refrigerating devices 9. Likewise, the conventional absorption type temperature regenerator is provided with a number of components including the dilution unit 15, the concentration unit 16, a circulating pump 17 for circulating the absorption liquid and water, and the regeneration heat exchanger 18. Moreover, although utilizing the high polymer film-like substance, the prior apparatus does not use it for the purpose of size reduction.

As obvious from the above description, because of being made up of a combination of a multiplicity of components, the prior apparatus has a problem in not meeting the requirements on cooling in units of electronic parts. In addition, the prior apparatus requires the moisture absorption liquid 1 and the absorption liquid or water circulating pumps 6, 17, with the result that difficulty is encountered to accomplish the noiseless cooling system.

SUMMARY OF THE INVENTION

The present invention has been developed with a view to eliminating the above-mentioned problems, and it is therefore an object of the present invention to provide a small-sized, resting, noiseless type of cooling system which exhibits a high efficiency and is free from maintenance, the cooling system features use of a solid electrolytic membrane having a function to electrolyse (carry out electrolysis) water molecule, where steam in a gas is electrolysed to produce a difference in humidity between both surfaces of the membrane to draw up heat by the water evaporation and condensation.

In order to achieve the above object, according to one aspect of the present invention, there is provided a water evaporation type cooling system based on an electrolytic reaction, comprising: a hermetically sealed housing including a gas; solid electrolytic membrane means placed within the hermetically sealed housing to divide the hermetically sealed housing into first and second hermetically sealed spaces, the solid electrolytic membrane means being constructed such that porous electrodes are provided on surfaces of solid high polymer electrolyte means allowing protons to selectively pass; water reservoired within the first hermetically sealed space; condensing means for condensing moisture contained in the gas within the second hermetically sealed space; water returning means for returning water, condensed by the condensing means, to the first hermetically sealed space; differential type ventilation means for allowing a communication between gas sections of the first and second hermetically sealed spaces when a difference in pressure between the gas sections of the first and second hermetically sealed spaces exceeds a predetermined operating pressure; and a direct-current power source for applying a direct-current voltage to between the porous electrodes of the solid electrolytic membrane.

According to another aspect of the present invention, there is provided a water evaporation type cooling system based on an electrolytic reaction, comprising: a hermetically sealed housing including a gas; solid electrolytic membrane means placed within the hermetically sealed housing to divide the hermetically sealed housing into first and second spaces, the solid electrolytic membrane means being constructed such that porous electrodes are provided on surfaces of solid high polymer electrolyte means allowing protons to selectively pass; a water-containing membrane formed within the first space; condensing means for condensing moisture, contained in the gas within the second space, in a condensing space communicated with the second space; water returning means for returning water condensed by the condensing means to the water-containing membrane made within the first space; a ventilation hole provided to establish a communication between the first and second spaces; and a direct-current power source for applying a direct-current voltage to between the porous electrodes on the solid electrolytic membrane means.

According to a further aspect of the present invention, there is provided a water evaporation type cooling method using a hermetically sealed housing including a gas and divided into first and second spaces by solid electrolytic membrane means having porous electrodes on surfaces of its solid high polymer electrolyte which allows protons to selectively pass, comprising the steps of: applying a direct-current voltage to between the porous electrodes to cause water electrolysis on a solid electrolytic membrane means surface at a first space side; transferring protons produced by the water electrolysis through the solid electrolytic membrane means to a solid electrolytic membrane means surface at a second space side; and causing a water production reaction to take place on the solid electrolytic membrane surface at the second space side to produce a difference in humidity between the first and second spaces to decrease the temperature of water reservoired in the first space.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

A description will be made hereinbelow of embodiments of the present invention with reference to the drawings.

First Embodiment

Figure 1:
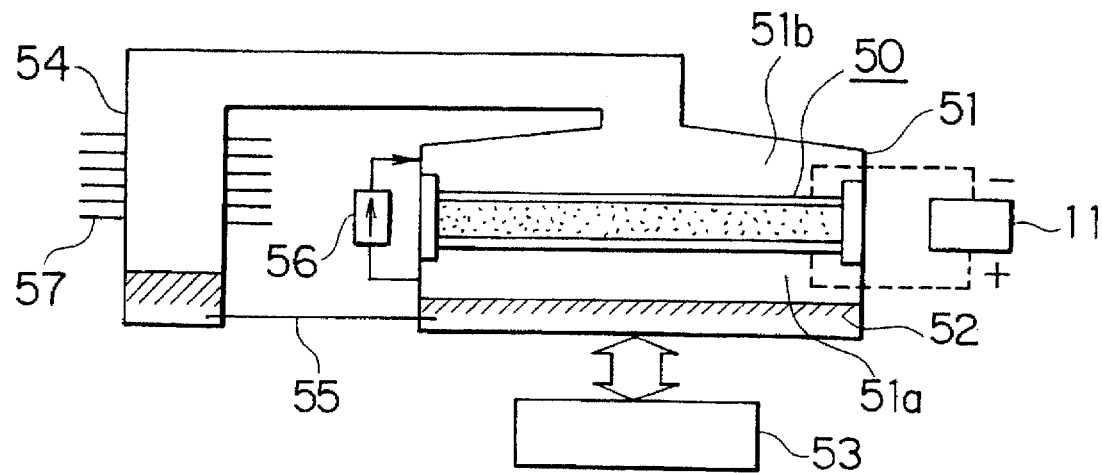
FIG. 1 is a schematic illustration of a construction of a water evaporation type cooling system based on an electrolytic reaction according to a first embodiment of the present invention.

FIG. 1 schematically illustrates a water evaporation type cooling system based on an electrolytic reaction according to a first embodiment of the present invention. In the illustration, the system is shown as comprising a solid electrolytic membrane 50 bearing a function to carry out electrolysis of water molecule, which membrane 50 is situated within a hermetically sealed housing (can) 51, forming a hermetically sealed space, to divide the hermetically sealed housing 51 into first and second hermetically sealed spaces 51a, 51b. In addition, both surfaces of the solid electrolytic membrane 50 are coupled to a direct-current power source 11 to accept a direct-current voltage therefrom. A bottom portion of the space 51a accepts water 52 which is thermally coupled with an object 53 being cooled. A condenser 54 is placed to communicate with the aforesaid space 51b. To the outer surface of the condenser 54 there is attached a heat radiator 57 which absorbs heat from the internal steam and radiates the heat to the external. The steam coming from the space 51b into the condenser 54 is cooled and condensed into water which in turn, is reservoired in a bottom portion of the condenser 54. The condensed water reservoir of the bottom portion of the condenser 54 is communicated through a water passage 55, serving as a water returning means, with the water storage of the space 51a. In addition, a differential pressure type ventilation mechanism 56 acting as a differential pressure type ventilation means is provided to establish a communication between a gas (or vapor) section of the space 51b and a gas (vapor) section of the space 51a. In this instance, the differential pressure type ventilation mechanism 56 may also be designed to make a communication between a gas section of the condenser 54 and the gas section of the space 51a. Further, oxygen gas and steam are enclosed within the spaces 51a, 51b pressure-reduced.

Secondly, a description will be taken hereinbelow of a structure of the solid electrolytic membrane 50 with reference to FIG. 2. This solid electrolytic membrane 50 is composed of a proton conductor 58 being a solid high polymer electrolyte which allows proton to selectively pass thereinto, with the proton conductor 58-being sandwiched between an anode (positive electrode) 59 and a cathode (negative electrode) 60. A resin-made frame 61 holds the end portions of the proton conductor 58, the anode 59 and the cathode 60 so that the anode 59 and the cathode 60 are fixedly secured onto both surfaces of the proton conductor 58, respectively. This proton conductor 58 can be a proton exchange membrane (solid high polymer electrolytic membrane) such as Nafion-117 (a registered trademark of Du Pont Co., Ltd.). Further, the anode 59 and the cathode 60 can be a porous electrode which is constructed with a platinum-plated mesh member made of titanium, tantalum or stainless steel or with a metal-plated member wherein fibers serve as feeders.

Figure 3:
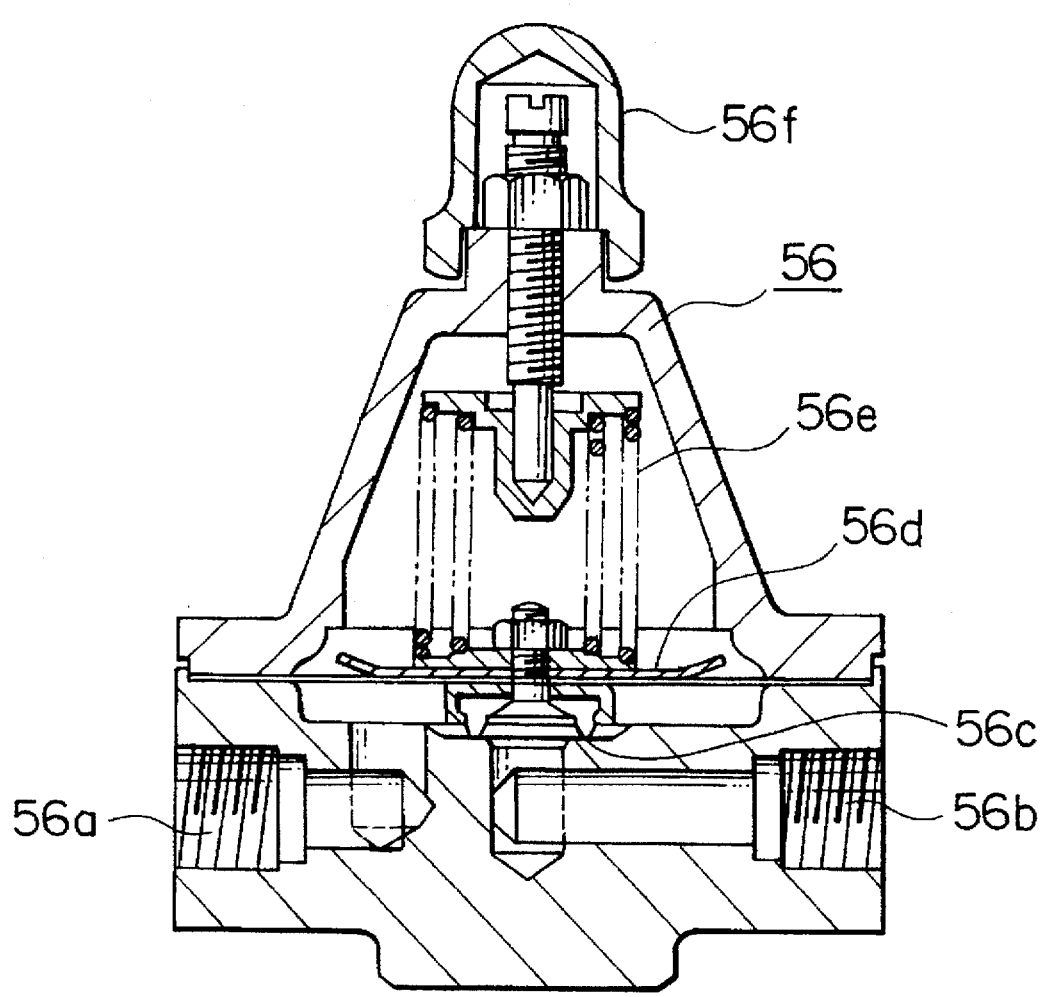
FIG. 3 is a cross-sectional view showing a structure of a differential pressure type ventilation mechanism for use in the water evaporation type cooling system based on the electrolytic reaction according to the first embodiment of this invention.

Furthermore, a description will be made hereinbelow of a structure of the differential pressure type ventilation mechanism 56 with reference to FIG. 3. This differential pressure type ventilation mechanism 56 includes a valve chest 56a and a valve chest 56b divided through a valve 56c. A closing force by a diaphragm 56d and a pressure adjusting spring 56e is made to work on the valve 56c. When the difference in pressure between the valve chest 56a and the valve chest 56b exceeds the closing force applied to the valve 56c, the valve 56c gets into the open condition to allow the ventilation. This closing force is equivalent to an operating pressure of the differential pressure type ventilation mechanism 56, and is easily adjustable by, for example, revolving an adjusting screw 56f to the expansion or shrinkage amount, i.e., the biasing force, of the pressure adjusting spring 56e.

A description will be made hereinbelow of the operation of the first embodiment of this invention. When a direct-current voltage from the direct-current power source 11 is applied to between the anode 59 and the cathode 60, an oxidizing/reducing reaction takes place on both the electrode surfaces as expressed by the following formula. At this time, as shown in FIG. 2, H⁺ (proton) produced due to the electrolysis of water on the anode 59 passes through the proton conductor 58 and reaches the cathode 60 to contributes to the production of water. Thus, water is electrolysed at the anode 59, water is produced at the cathode 60, with the result that the steam at the anode 59 side is transferred to the cathode 60 side while the oxygen at the cathode 60 side is shifted to the anode 59 side.

Anode: $H_2O \rightarrow 2H^+ + \frac{1}{2}O_2 + 2e^-$

Cathode: $2H^+ + \frac{1}{2}O_2 + 2e^- \rightarrow H_2O$

As a whole: $H_2O$ (anode side) $\rightarrow H_2O$ (cathode side)

$O_2$ (cathode side) $\rightarrow O_2$ (anode side)

If the solid electrolytic membrane 50 is placed so that the anode 59 is positioned at the space 51a side, due to this reaction the steam within the space 51a is shifted to the space 51b side and the oxygen within the space 51b is shifted to the space 51a side. Whereupon, the humidity within the space 51a drops, with the result that the evaporation of the water 52 reservoired is accelerated to induce the temperature drop.

Since the water 52 reservoired in the space 51a is thermally coupled to the object 53 being cooled, the heat generated in the interior of the object 53 being cooled is absorbed by the water 52 which undergoes the temperature drop within the space 51a. Thus, the object 53 being cooled is cooled whereas the water 52 is evaporated due to the heat absorption. Further, the steam generated by the evaporation is drawn into the space 51b by means of the steam drawing action of the solid electrolytic membrane 50, with the space 51a being always maintained to show a low humidity and accelerating the evaporation of the water 52. The steam drawn from the space 51a to the space 51b flows into the condenser 54 coupled thereto in a passage form. Heat of the steam flowing into the condenser 54 is radiated or evolved through the heat radiator 57 to the external and hence the steam is cooled to turn into condensed water which in turn, is reservoired in the bottom portion of the condenser 54. This condensed water reservoired in the bottom portion of the condenser 54 successively returns through the water passage 55 to the bottom portion of the space 51a. Thus, the water 52 within the space 51a can be circulated without using a mechanical means such as a pump.

On the other hand, owing to an oxygen molecule transferring function the solid electrolytic membrane 50 has in addition to the steam drawing action, the oxygen gas within the space 51b is transferred into the space 51a. This raises the pressure within the space 51a and lowers the pressure within the space 51b, with the result that a pressure difference arises between both the spaces 51a and 51b. When this pressure difference exceeds the operating pressure of the differential pressure type ventilation mechanism 56, the valve 56c comes into the open condition so that the valve chests 56a and 56b communicate with each other to allow the oxygen gas within the space 51a to return to the space 51b. Whereupon, the mutual steam and oxygen gas transferring operations of the solid electrolytic membrane 50 continue.

Figure 4:
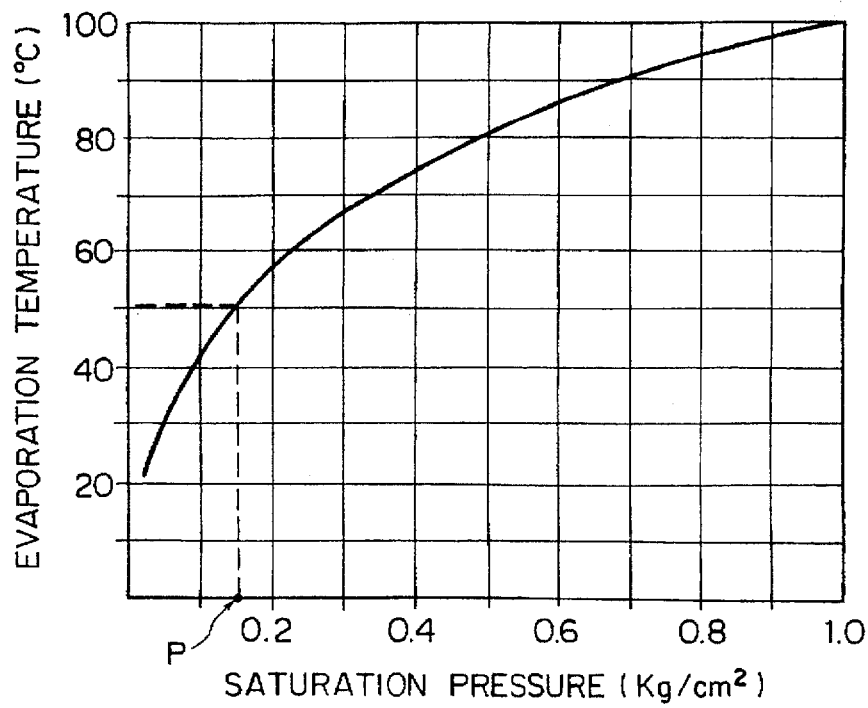
FIG. 4 illustrates the relationship between the boiling evaporation temperature and the saturation pressure of water.

The cooling system is required to arbitrarily set the cooling temperature, for that the cooling temperature necessary for the object 53 being cooled depends on various situations. FIG. 4 illustrates the relationship between the boiling evaporation temperature of water and the saturation pressure. As obvious from the illustration, a given cooling temperature can be set in such a manner that the operating pressure of the hermetically sealed housing 51 is fixed so that the water boiling evaporation temperature comes to below the cooling temperature of the object 53 being cooled. For example, in cases where the object 53 being cooled is needed to be cooled to below 50° C., as indicated by a dotted line in FIG. 4 a gas containing steam and oxygen is filled in the hermetically sealed housing 51 so that the pressure within the hermetically sealed housing 51 becomes below the value (0.15 Kg/cm$^2$) indicated by a point P.

Figure 5:
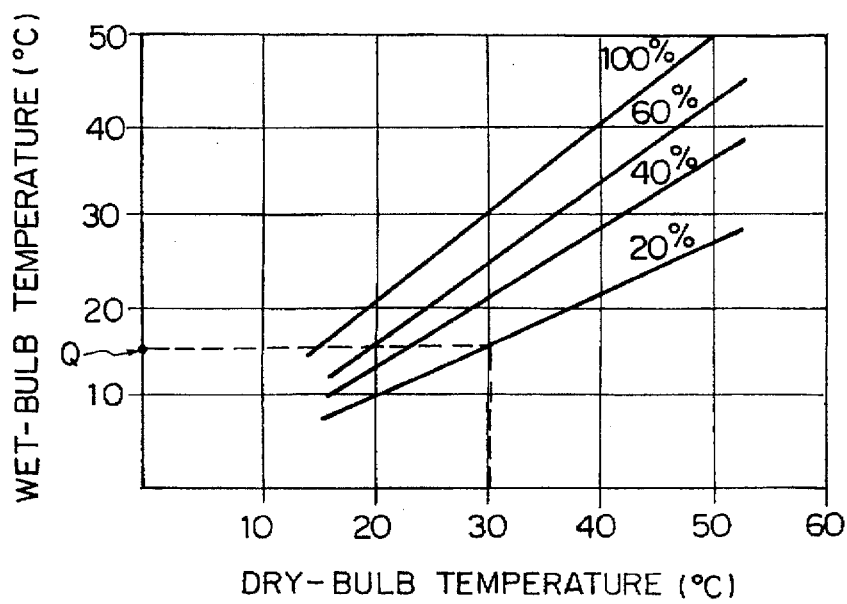
FIG. 5 illustrates the relationship in temperature between a dry-bulb and wet-bulb in the case that a gas comes into contact with water.

Furthermore, a description will be made hereinbelow of the principle that the cooling of the object 53 being cooled is possible with the construction of the cooling system according to this invention. FIG. 5 shows the moisture contents of gases, i.e., the relationship between the wet-bulb temperature and the dry-bulb temperature with respect to the relative humidity when water and gas are in contact condition. The dry-bulb temperature is a temperature of a gas coming into contact with water, and the temperature of water coming into contact with a gas drops to endlessly approach the wet-bulb temperature. For instance, as indicated by a dotted line in FIG. 5, the wet-bulb temperature of a gas having a temperature of 30° C. and a relative humidity of 20% assumes a value (16° C.) indicated by a point Q. Thus, the temperature of the water coming into contact therewith results in dropping toward 16° C. For this reason, if the water coming into a gas with a low humidity is in thermally coupled relation to the object 53 being cooled, the object 53 can be cooled to below the ambient temperature.

Figure 6:
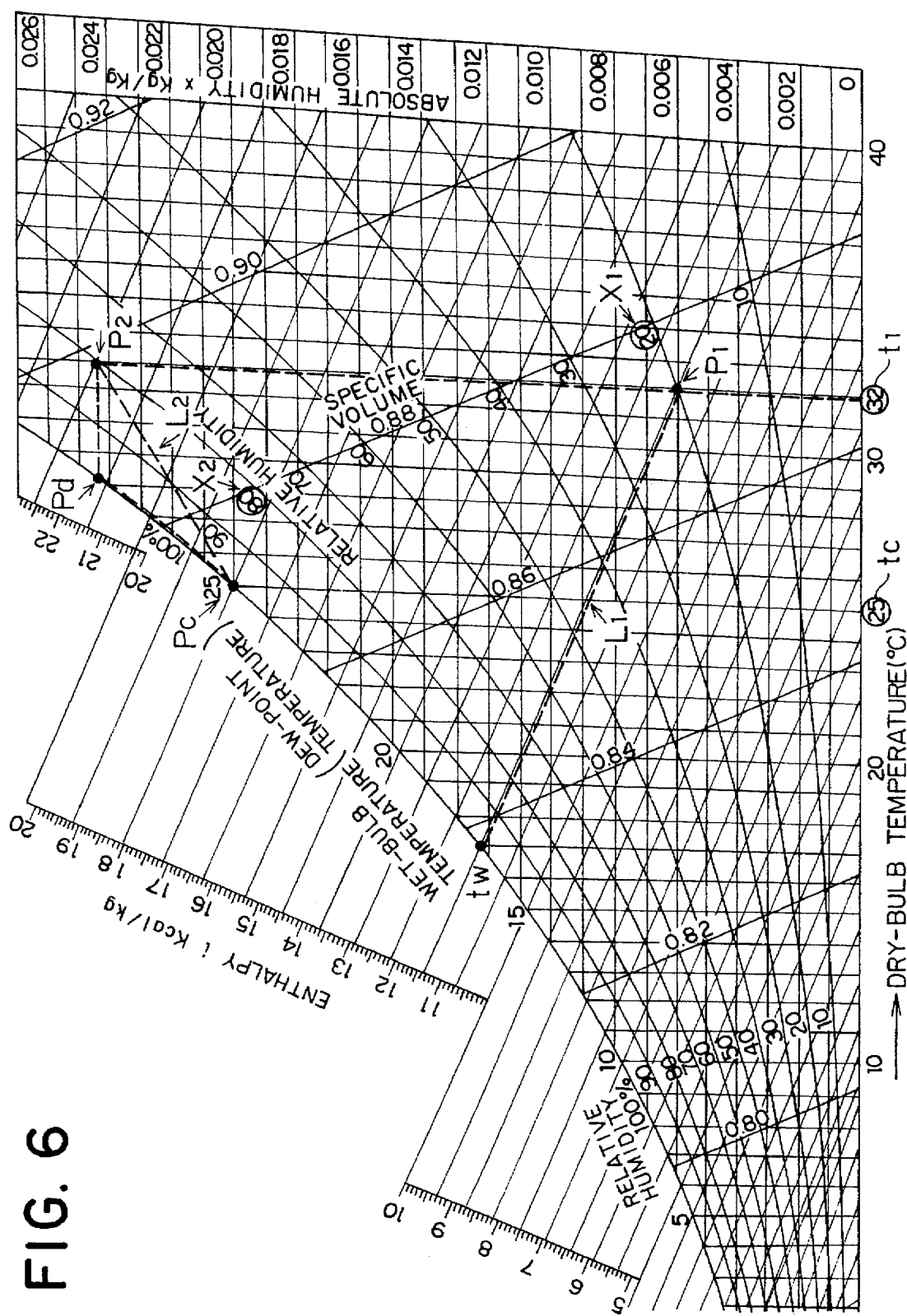
FIG. 6 is an illustration available for explaining a cooling operation in the water evaporation type cooling system based on the electrolytic reaction according to the first embodiment of this invention.

FIG. 6 illustrates the operating condition of the FIG. 1 system on an air line chart. In the illustration, assuming that the relative humidity of the space 51a is taken as $x_1$ and its space temperature $t_1$, the thermal condition of the space is shown at a point $P_1$ on the air line chart. Thus, the water 52 coming into contact with the gas with the relative humidity $x_1$ starts to drop along a line $L_1$ toward the wet-bulb temperature $t_w$. Further, the water 52 receives heat from the object 53 thermally coupled thereto and hence enters an equilibrium condition at its intermediate temperature. Owing to the action of the solid electrolytic membrane 50, the steam generated in the space 51a is shifted to the space 51b, while the oxygen gas is shifted from the space 51b to the space 51a, with the result that the relative humidity of the space 51a is always maintained to be low.

Likewise, supposing that the relative humidity of the space 51b is taken to be $x_2$ in the saturation state or in the vicinity of the saturation state and the space temperature is taken to be $t_1$, the thermal state of the space is indicated at a point $P_2$ on the air line chart. If the condensation temperature of the condenser 54 is the thermal state of the gas horizontally shifts from the point $P_2$ to a point $P_d$, while the steam starts to condense and reaches a point $P_c$ when being further cooled, and then returns to the space 51b along a straight line $L_2$, thus taking a state indicated by the point $P_2$. This repetition condenses the steam shifted from the solid electrolytic membrane 50. Owing to the aforesaid electrolytic reaction, the oxygen gas equal in mol to the steam moves between the spaces 51b and 51a in a direction opposite to that of the steam.

As described above, according to the first embodiment, the hermetically sealed housing 51 enclosing the oxygen and steam is divided by the solid electrolytic membrane 50 into the spaces 51a and 51b, and the solid electrolytic membrane 50 surface at the space 51a side causes the electrolysis of water while the proton produced by the water electrolysis is supplied through the solid electrolytic membrane 50 to another solid electrolytic membrane 50 surface at the space 51b side so that the production reaction of water occurs on the solid electrolytic membrane 50 surface at the space 51b side to create the difference in humidity between the spaces 51a and 51b, and subsequently the water 52 reservoired within the space 51a is brought into contact with the gas with a low humidity within the space 51a to reduce the temperature of the water. With this arrangement, the water 52 and the gas can be circulated without the use of a mechanical means such as a pump, thereby providing a noiseless cooling method which is also applicable to the local cooling on an electronic substrate.

Moreover, this embodiment is equipped with the solid electrolytic membrane 50 placed to divide the hermetically sealed housing 51 enclosing the oxygen and the steam into the two spaces 51a and 51b, the water 52 reservoired in the space 51a, the condenser 54 provided to communicate with the space 51b, the water passage 55 for setting up a communication between the condensed water reservoir portion of the condenser 54 and the water reservoir portion of the space 51a, the differential pressure type ventilation mechanism 56 for establishing a communication between the gas sections of the spaces 51a and 51b, and the direct-current power source 11 for the application of a direct-current voltage to both the surfaces of the solid electrolytic membrane 50. Thus, the system can circulate the water 52 and the gas without the use of a mechanical means such as a pump, and can be constructed with resting devices and therewith less components. This permits a size reduction and hence allows a microscopic-level or small-scale cooling such as local cooling on an electronic substrate. In addition, this system can be noiseless. Moreover, with no driving means in its interior, the resultant cooling system is free from maintenance. Further, since the cooling temperature of the water 52 is adjustable by adjusting the pressure of the gas filled in the hermetically sealed housing 51, the cooling becomes possible in accordance with the cooling temperature needed for the object 53 being cooled. Still further, now that the gas filled in the spaces 51a and 51b is produced with oxygen gas and steam, only factors contributing to the electrolysis exist within the spaces 51a and 51b, thus promoting the reaction and enhancing the cooling ability.

Second Embodiment

Figure 7:
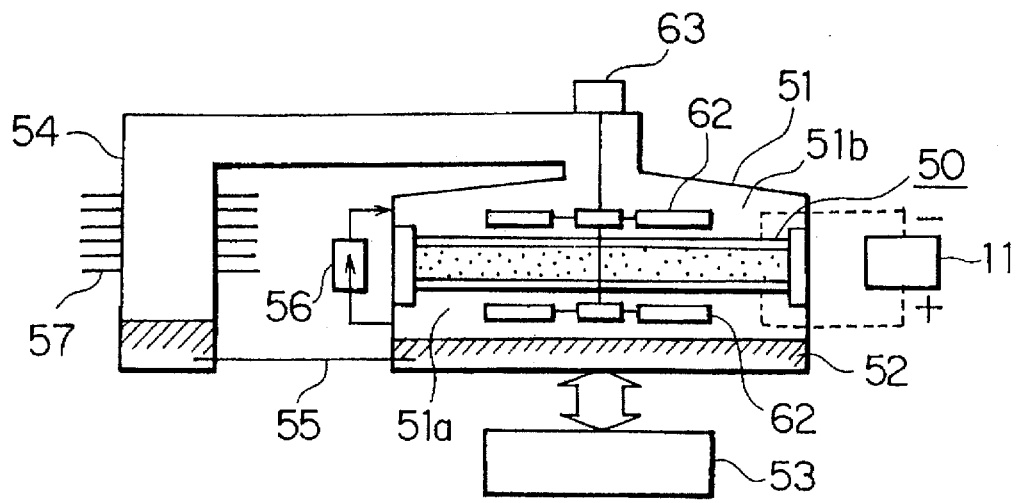
FIG. 7 schematically shows a construction of a water evaporation type cooling system based on an electrolytic reaction according to a second embodiment of this invention.

Although in the above-described first embodiment the movement of the gas between the spaces 51a and 51b depends on the natural convection due to the difference in specific weight between water molecule and oxygen molecule, that is, due to the specific weight of water molecule being approximately ½ of that of the oxygen molecule, in this second embodiment rotary wings 62 organizing a mixing or agitating means are, as shown in FIG. 7, provided within the gas sections of the spaces 51a and 51b and are made to be rotationally driven by a driving device 63.

Accordingly, according to this second embodiment, with the rotary wings 62 being rotationally driven by the driving device 63, the gases within the spaces 51a and 51b is moved compulsorily. Thus, the oxygen molecules and the water molecules can effectively come into contact with the electrolytic reaction surfaces of the solid electrolytic membrane 50, i.e., the anode 59 and the cathode 60, thereby promoting the electrolytic reaction to enhance the cooling ability.

Third Embodiment

Figure 8:
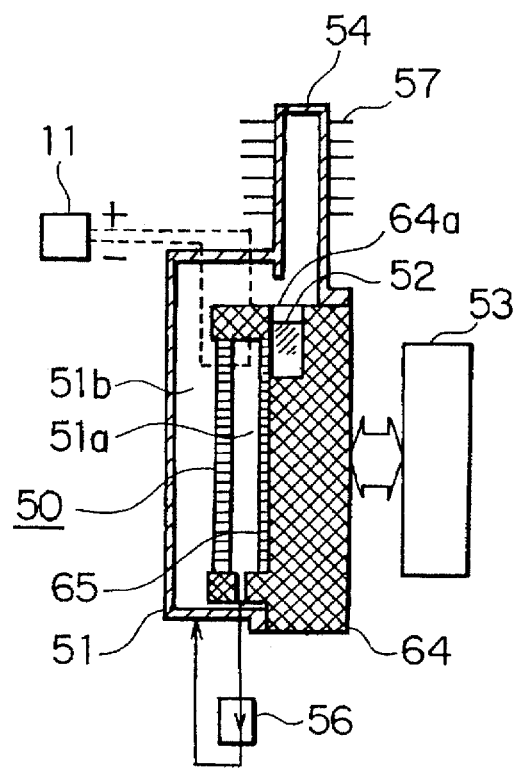
FIG. 8 schematically shows a construction of a water evaporation type cooling system based on an electrolytic reaction according to a third embodiment of this invention.

Although in the above-described first embodiment the water 52 is reservoired in the bottom portion of the space 51a and is brought into contact with the gas with a low humidity so that its temperature falls and is further thermally coupled to the object 53 being cooled to cool the object 53, in this third embodiment, as shown in FIG. 8 a cooling plate 64 thermally coupled to the object 53 being cooled is integrally attached to a portion of the hermetically sealed housing 51 so that the space 51a is defined by the solid electrolytic membrane 50, the hermetically sealed housing 51 and the cooling plate 64. In addition, onto the surface of the cooling plate 64 facing the solid electrolytic membrane 50 there is fixedly secured a water-containing layer 65 which is a porous plate, a mesh-like plate or a film-like plate bearing a good thermal conductivity and a water absorptive property. Further, a portion of this cooling plate 64 is positioned under the condenser 54 and has a condensed water reservoir portion 64a made to store the condensed water by the condenser 54, and this condensed water reservoir portion 64a communicates with the water-containing layer 65 so that the water-containing later 65 is kept to be in a wet condition.

As described above, since in this third embodiment the water-containing layer 65 is placed to face the anode 59 of the solid electrolytic membrane 50, as well as the aforementioned first embodiment, the steam within the space 51a is delivered to the space 51b while the oxygen molecules within the space 51b is delivered to the space 51a so that the space 51a shows a low humidity and the surface of the water-containing layer 65 comes into contact with the low-humidity gas so that the temperature of the water-containing layer 65 drops. As a result, the cooling plate 64 is cooled to effectively cool the object 53 being cooled which is thermally coupled thereto. In addition, since the condenser 54 is located above the cooling plate 64 to be coupled to the space 51b in a passage form and the water reservoir portion 64a is provided in the cooling plate 64 to be positioned right under the condenser 54 and further is coupled to the water-containing layer 65 so that the water moves thereinto, the steam within the space 51b moves to the upper condenser 54 due to the gravity difference because its specific weight is smaller than that of the oxygen. Accordingly, the steam is condensed in the condenser 54 to turn into condensed water which in turn, drops to be stored in the condensed water reservoir portion 64a. Subsequently, the water 52 stored in the condensed water reservoir portion 64a is supplied to the water-containing layer 65 due to the gravity difference so that the water-containing layer 65 is maintained to be in the wet condition. Further, the water 52 contained in the water-containing layer 65 is evaporated from its surface into the space 51a, thus continuing the circulation of the water and the steam.

On the other hand, the pressure within the space 51a rises in response to the oxygen gas from the space 51b, while the oxygen gas is returned from the space 51a to the space 51b by the differential pressure type ventilation mechanism 56.

Accordingly, the circulation of the water and the gas becomes possible without the use of a power and a circulating passage, thus allowing a size reduction.

Fourth Embodiment

Figure 9:
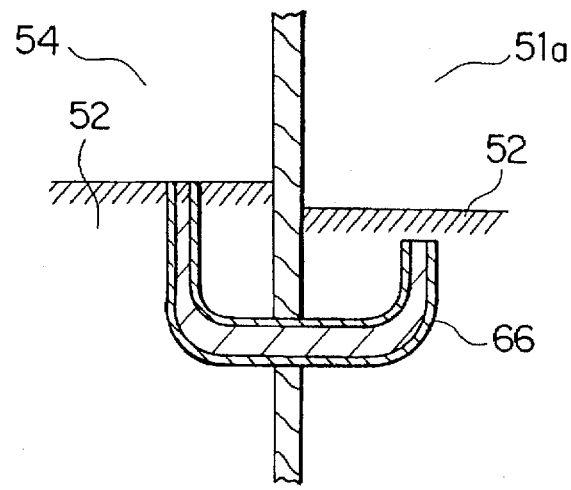
FIG. 9 schematically shows a construction of a differential pressure type ventilation mechanism of a water evaporation type cooling system based on an electrolytic reaction according to a fourth embodiment of this invention.

Although in the above-described first embodiment the water passage 55 allows the communication between the condensed water reservoir portion of the bottom section of the condenser 54 and the water reservoir portion of the space 51a, in this fourth embodiment, as shown in FIG. 9 a U-shaped pipe 66 being a pipe line is provided in the condensed water reservoir portion of the bottom portion of the condenser 54 so that its one end portion is positioned to come to under the level of (dive into) the water 52 of the reservoir portion of the space 51a when the pressure difference between the gas sections of the spaces 51a and 51b is less than a preset or specified value and to protrude from the water 52 when the pressure difference exceeds the preset value while its other end portion is placed at a higher than the level of the water 52 of the water reservoir portion of the space 51a when the pressure difference is less than the preset value.

Thus, in this fourth embodiment, when the pressure difference between the gas sections of the spaces 51a and 51b is below the preset value, the condensed water produced in the condenser 54 is stored within the condensed water reservoir portion. Further, the level of the condensed water stored in the condensed water reservoir portion becomes higher than the other end of the U-shaped pipe 66, the condensed water flows through the U-shaped pipe 66 into the water reservoir portion of the space 51a, thus achieving the water circulation. Further, when the pressure difference between the gas sections of the spaces 51a and 51b becomes large, the level of the water 52 within the water reservoir portion of the space 51a drops. When the pressure difference comes to the preset value, the one end portion of the U-shaped pipe 66 coincides with the level of the water 52. When the pressure difference becomes larger, the water within the U-shaped pipe 66 is pressed toward the condenser 54 side and the gas within the space 51a is discharged to the condenser 54, resulting in eliminating the pressure difference. Owing to no pressure difference between the spaces 51a and 51b, the one end portion of the U-shaped pipe 66 comes to under the water 52 in the water reservoir portion, with the result that the water circulation restarts through the U-shaped pipe 66. Therefore, according to this fourth embodiment, the U-shaped pipe 66 exhibits the water circulation function simultaneously with the gas circulation function, and hence the differential pressure type ventilation mechanism 56 becomes unnecessary, thereby simplifying the components and allowing its size reduction.

Fifth Embodiment

Figure 10:
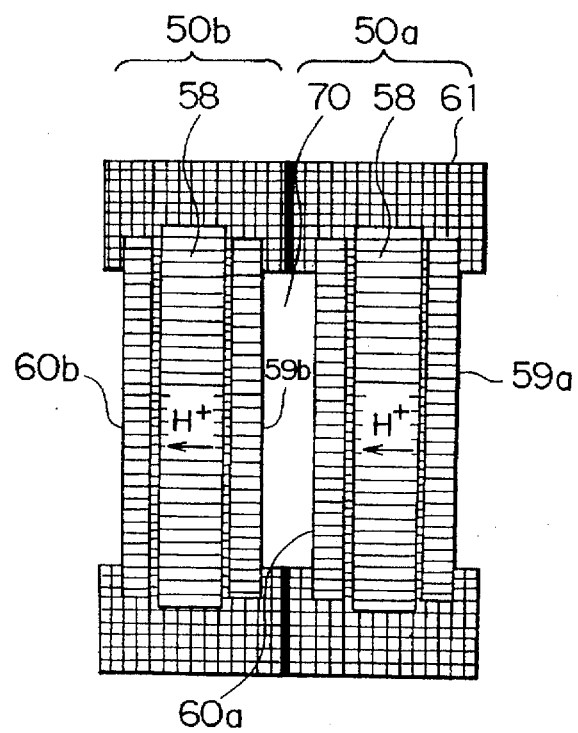
FIG. 10 schematically illustrates a structure of a solid electrolytic membrane of a water evaporation type cooling system based on an electrolytic reaction according to a fifth embodiment of this invention.

Although in the aforementioned first embodiment the hermetically sealed housing 51 is divided into the two spaces 51a and 51b by one solid electrolytic membrane 50, in this fifth embodiment, as shown in FIG. 10 two solid electrolytic membranes, i.e., first and second solid electrolytic membranes 50a and 50b having a similar construction to the aforementioned solid electrolytic membrane 50, are used and disposed at a certain interval to divide the hermetically sealed housing 51 into the spaces 51a and 51b and to define a hermetically sealed space 70. In this case, the first and second solid electrolytic membranes 50a and 50b are arranged in series in a direction that the hydrogen moves.

Secondly, a description will be made hereinbelow of the operation of this fifth embodiment of this invention. A direct-current voltage is applied from the direct-current power source 11 to an anode 59a and a cathode 60a of the first solid electrolytic membrane (water electrolytic cell section) 50a. Thus, the following electrolytic reaction takes place on the surfaces of the anode 59a and the cathode 60a.

Anode side: $H_2O \rightarrow 2H^+ + \frac{1}{2}O_2 + 2e^-$

Cathode side: $2H^+ + 2e^- \rightarrow H_2$

That is, the anode 59a consumes steam and produces an oxygen gas, while the cathode 60a produces a hydrogen gas. Further, this hydrogen gas produced here is hermetically packed in the hermetically sealed space 70 so as to form a low-humidity gas space. The space 51a is maintained to show a low humidity, while the space 51b is kept to show a high humidity, thereby creating an inter-membrane humidity difference. Thus, in the case that as in the above-mentioned first embodiment the spaces 51a and 51b are formed by the one solid electrolytic membrane 50, since the proton conductor 58 (solid high polymer electrolytic membrane) has a moisture permeability, the steam moves from the high-humidity side through the proton conductor 58 to the low-humidity side. This corresponds to the opposite movement of the steam when being viewed as a system, thus impairing the movement efficiency in the system. However, the low-humidity gas space defined in the hermetically sealed space 70 can act to block the aforesaid steam opposite movement to suppress the deterioration of the movement efficiency of the steam.

On the other hand, at the electrode 59b of the second solid electrolytic membrane 50b (water producing cell section), a dissociation reaction occurs to ionize hydrogen molecules, while at the electrode 60b a reaction arises to convert oxygen molecules into water molecules.

Electrode 59b: $H_2 \rightarrow 2H^+ + 2e^-$

Electrode 60b: $2H^+ + 2e^- + \frac{1}{2}O_2 \rightarrow H_2O$

The reactions expressed by the above formulas are based on the principle of a fuel cell. An electromotive force develops between the electrodes 59b and 60b, and the power applied to the first solid electrolytic membrane 50a is recovered from the second solid electrolytic membrane 50b for reclamation (re-utilization).

Figure 11:
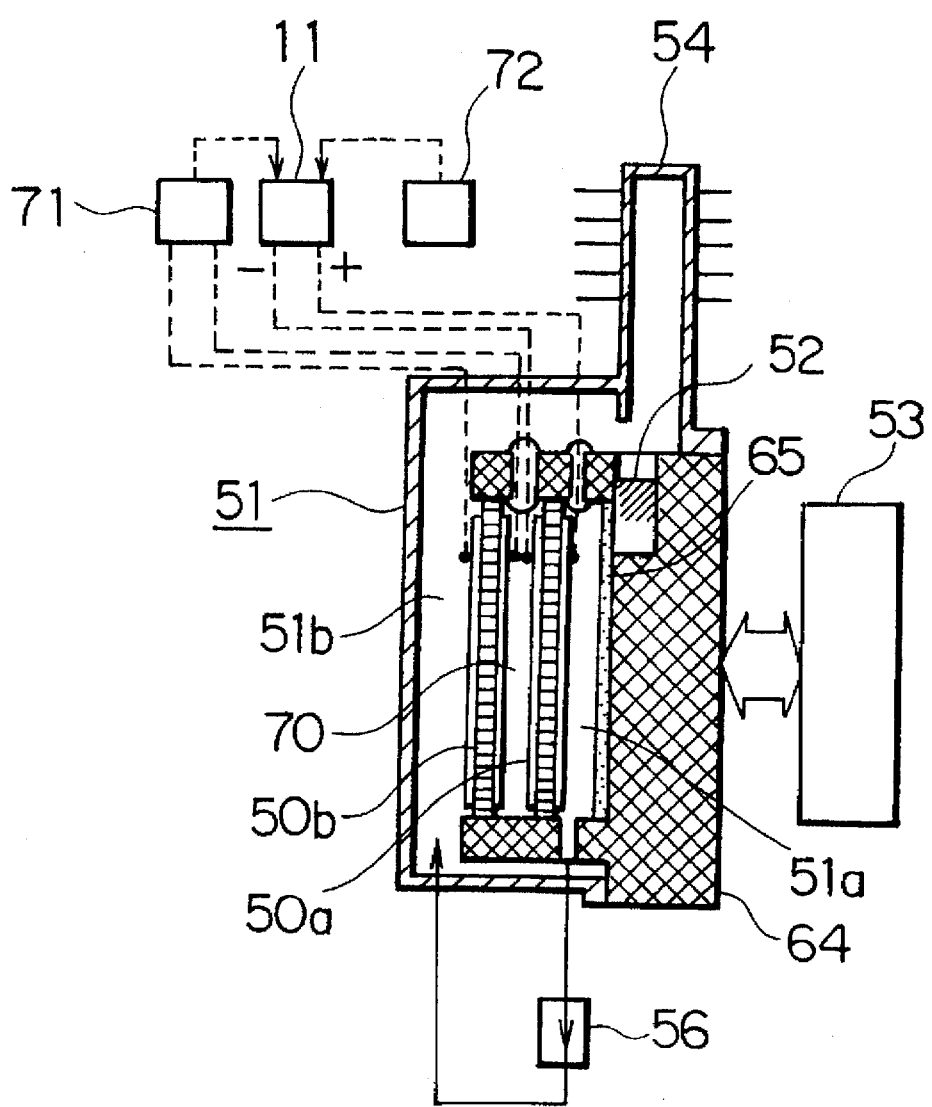
FIG. 11 is a schematic illustration of a construction of the water evaporation type cooling system based on the electrolytic reaction according to the fifth embodiment of this invention.

Furthermore, a description will be made with reference to FIG. 11 in terms of a system of reclaiming the electromotive force recovered at the second solid electrolytic membrane 50b for the electrolytic reaction in the first solid electrolytic membrane 50a. First of all, a direct-current voltage is given from the direct-current power source 11 to the first solid electrolytic membrane 50a to cause the water electrolytic reaction to occur in the first solid electrolytic membrane 50a, meanwhile the water formation reaction takes place in the second solid electrolytic membrane 50b. At this time, an electromotive force is generated due to the reaction in the second solid electrolytic membrane 50b. This generated electromotive force is accepted and recovered by an electromotive force recovering device 71. In addition, the power recovered by the electromotive force recovering device 71 is supplied to the first solid electrolytic membrane 50a in place of the power from the direct-current power source 11, thereby maintaining the electrolytic reaction and hence continuing the cooling operation. However, the power consumption arises by the Joule' heat loss and others in each solid electrolytic membrane, and hence the power recovered by the electromotive force recovering device 71 results in not sufficiently covering the power necessary. Accordingly, a power supplementing source 72 is provided to supplement the power.

As described above, according to this fifth embodiment, the gas space is formed in the hermetically sealed space 70 between the first and second solid electrolytic membranes 50a and 50b to block the reverse movement of the steam from the space 51b (high humidity side) to the space 51a (low humidity side), thus suppressing the lowering of the movement efficiency and improving the cooling performance. In addition, since the electromotive force generated between the electrodes 59b and 60b of the second solid electrolytic membrane 50b is recovered for reclamation, an energy-saving system is achievable.

Although in this fifth embodiment the first and second solid electrolytic membranes 50a and 50b are disposed at a certain interval, it is also appropriate that the first and second solid electrolytic membranes 50a and 50b are disposed to be brought into contact with each other. In this case, the hermetically sealed space 70 to be defined between the first and second solid electrolytic membranes 50a and 50b comes to a minimum, with the result that the hydrogen gas space becomes at a minimum, thus improving the system safety.

Sixth Embodiment

Figure 12:
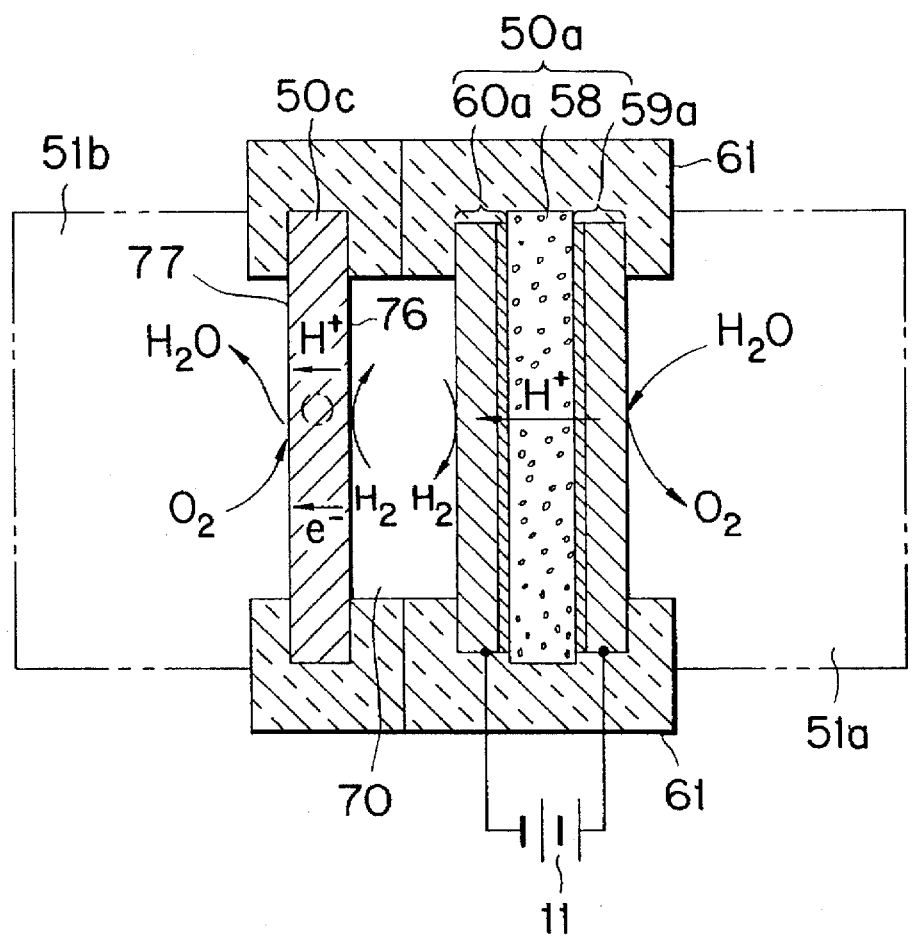
FIG. 12 is a schematic illustration of a structure of a solid electrolytic membrane for use in a water evaporation type cooling system based on an electrolytic reaction according to a sixth embodiment of this invention.
Figure 12A:
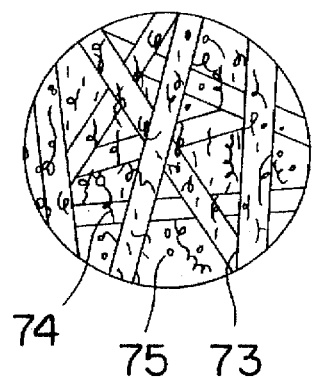

Although in the aforesaid fifth embodiment the first and second solid electrolytic membranes 50a and 50b are disposed at a given interval, in this sixth embodiment, as shown in FIG. 12, in place of the second solid electrolytic membrane 50b being the water generating section, a second solid electrolytic membrane 50c is employed wherein an electrical short-circuit is formed in the interior of the solid high polymer electrolytic membrane. This second solid electrolytic membrane 50c does not separately have the positive electrode and the negative electrode at its both surfaces but is constructed as an internal short-circuit electrode being a single electrode.

More specifically, the second solid electrolytic membrane 50c is constructed such that a cation conductive solid high polymer electrolyte 74 and a platinum fine-particular catalyst 75 are impregnated in holes of an electron conductive porous base material 73 to three-dimensionally come into contact with each other. Accordingly, in this second solid electrolytic membrane 50c, the protons and electrons are simultaneously movable from its rear surface (facing the first solid electrolytic membrane 50a) 76 to its front surface 77.

On the rear surface 76 of the second solid electrolytic membrane 50c, the hydrogen produced at the cathode 60a of the first solid electrolytic membrane 50a being the water electrolytic cell section is consumed to produce protons and electrons. Further, the protons pass through the cation conductive solid high polymer electrolyte 74 impregnated in the holes of the porous base material 73 to shift from its rear surface 76 to its front surface 77. On the other hand, the electrons pass through the electron conductive porous base material 73 to shift from its rear surface 76 to its front surface 77. The protons and electrons transferred to the front surface 77 react with oxygen in the gas to generate water on the front surface 77, thus carrying out the cooling operation.

Thus, according to the sixth embodiment, since the second solid electrolytic membrane 50c serving as a single electrode is used in place of the second solid electrolytic membrane 5b, the system structure becomes simplified to allow the cost reduction.

Figure 13:
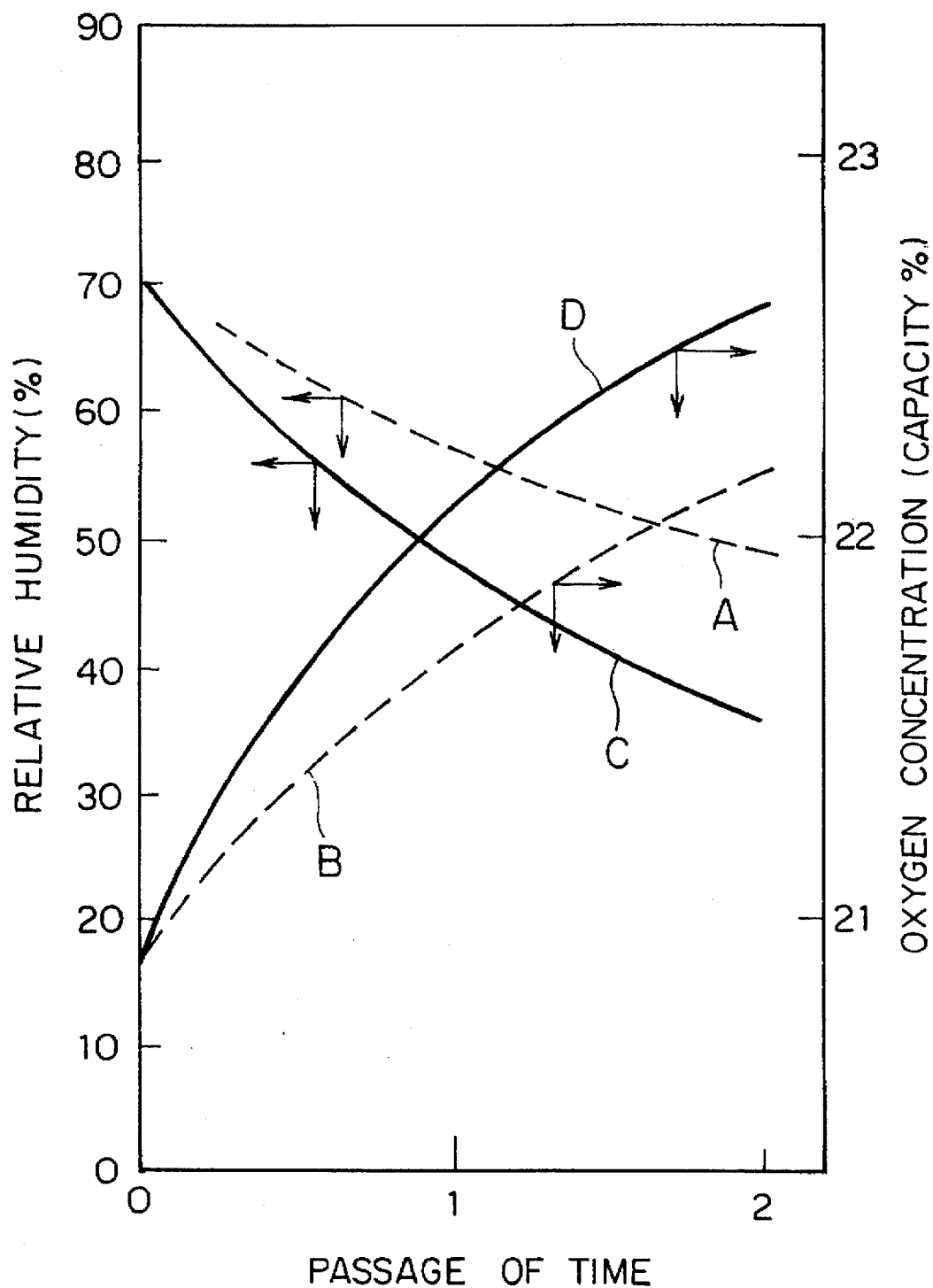
FIG. 13 illustrates a characteristic of the solid electrolytic membrane of the water evaporation type cooling system based on the electrolytic reaction according to the sixth embodiment of this invention.

FIG. 13 is an illustration of the results of an evaluation test for the dehumidification abilities and the oxygen concentration abilities for when using one solid electrolytic membrane 50 as described in the first embodiment and for when using the paired first and second solid electrolytic membranes 50a and 50c as described in the sixth embodiment. In the illustration, curves A and B respectively show the variations of the humidity and oxygen concentration with the passage of time in the water electrolytic space 51a in the case of the use of one solid electrolytic membrane, while curves C and D respectively show the variations of the humidity and oxygen concentration with the passage of time in the case of the use of a pair of solid electrolytic membranes. In this case, the water electrolytic space is hermetically sealed and is equipped with a humidity sensor and a concentration meter, while the water production space is held a temperature of 35° C. and a relative humidity of 70% by a constant temperature and high humidity bath, and the voltage to be applied is set to DC 3V.

From FIG. 13, comparing the curve A with the curve C, it is obvious that the use of the pair of solid electrolytic membranes more greatly reduces the humidity with the passage of time and exhibits a higher dehumidification performance. The reverse movement of steam is hindered by a gas space formed between the pair of solid electrolytic membranes, thereby improving the dehumidification performance. Further, comparing the curve B with the curve D, it is obvious from the same illustration that the use of the pair of solid electrolytic membranes more increases the oxygen concentration with the passage of time and shows a superior oxygen concentration performance.

Although in the aforementioned sixth embodiment the first and second solid electrolytic membranes 50a and 50c are disposed at a given separation, it is also possible that the first and second solid electrolytic membranes 50a and 50c are disposed to be brought into contact with each other. In this instance, the hermetically sealed space 70 to be defined between the first and second solid electrolytic membranes 50a and 50c assumes a minimum to cause the hydrogen gas space to become at a minimum, thus enhancing the system safety.

Seventh Embodiment

Figure 14:
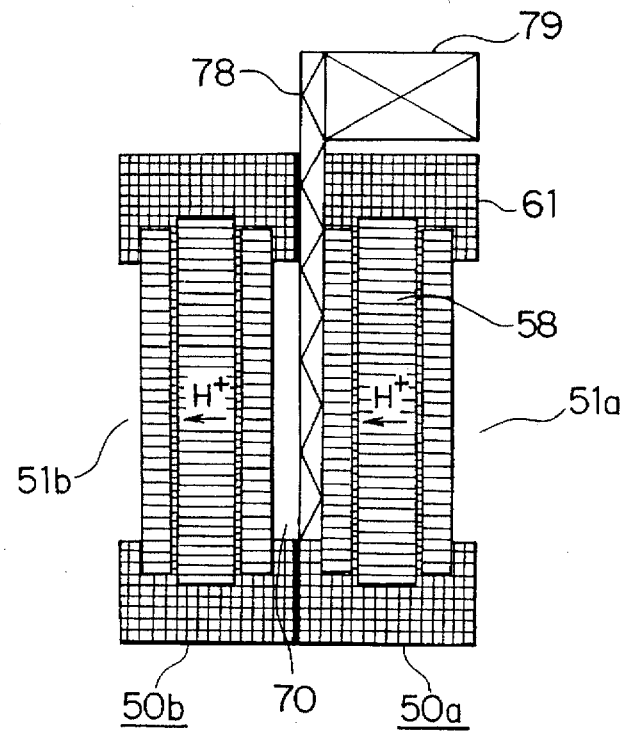
FIG. 14 is a schematic illustration of a construction of the electrolytic reaction based water evaporation type cooling system according to the seventh embodiment of this invention.

In this seventh embodiment, as shown in FIG. 14, in addition to the structure of the Fifth embodiment, a mesh-like thermal conductor 78 is attached onto the surface of the cathode 60a of the first solid electrolytic membrane 50a and is extended to the outside of the system, with a heat radiator 79 being attached to the extension portion thereof. A direct-current voltage is applied to between the electrodes of the solid electrolytic membrane to induce the oxidation/reduction (deoxidation) reactions on both the electrode surfaces so that as a whole the steam is shifted from the anode side to the cathode side while the oxygen is shifted from the cathode side to the anode side, and the steam within the space 51a is delivered to the space 51b side while the oxygen within the space 51b is delivered to the space 51a side. Whereupon, the humidity within the space 51a becomes lower, thereby accelerating the evaporation of the water 52 reservoired in the space 51a to induce the temperature drop. At this time, in the proton conductor 58 the Joule heat is generated due to the flow of the current and the reaction heat is generated due to the chemical reaction, thus inducing the temperature rise of the proton conductor 58. However, the heat of the proton conductor 58 is transmitted to the thermal conductor 78 and radiated through the heat radiator 79, with the result that the temperature elevation of the proton conductor 58 is suppressible to allow the proton conductor 58 to be maintained at a given temperature, thereby improving the cooling ability.

Figure 15:
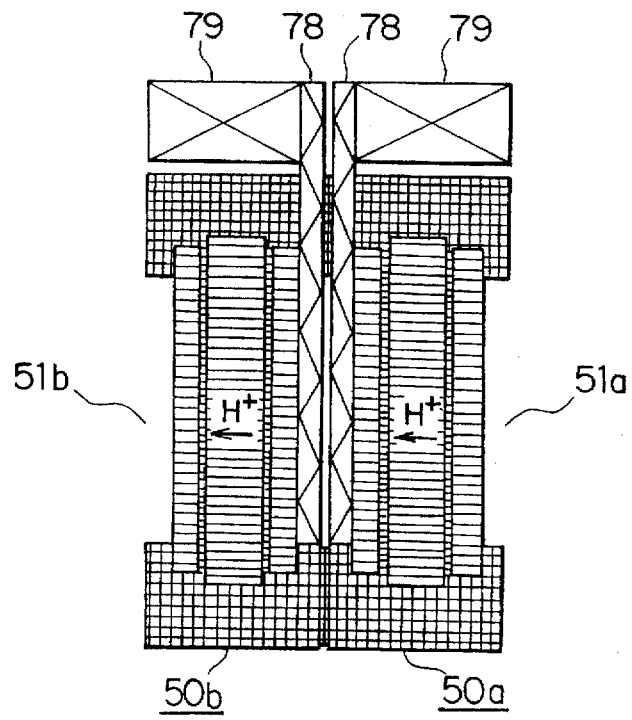
FIG. 15 is a schematic illustration of a construction of a modification of the water evaporation type cooling system based on the electrolytic reaction according to the seventh embodiment of this invention.

Although in the above-mentioned seventh embodiment the thermal conductor 78 is attached onto only the cathode 60a of the first solid electrolytic membrane 50a, the thermal conductor 78 can also be attached to only the anode 59a of the second electrolytic membrane 50b or as shown in FIG. 15 the thermal conductor 78 can be attached to both the first and second solid electrolytic membranes 50a and 50b. Even these cases can have the same effects. In addition, even if in the above-described first embodiment the one solid electrolytic membrane 50 is equipped with the thermal conductor 78, then it is also possible to enhance the cooling performance.

Eighth Embodiment

Although in the above-described embodiments steam and oxygen are packed as the gas within the hermetically sealed housing 51, in the eighth embodiment air is packed as the gas within the hermetically sealed housing 51 and its operation is always made at the vicinity of the atmospheric pressure. In this case, the gas contains nitrogen and others which do not contribute to the electrolytic reaction, and hence there is a disadvantage in the rate of reaction. However, because of the operation at the vicinity of the atmospheric pressure, there is no need to worry about gas leakage, and the system manufacturing becomes simplified.

Ninth Embodiment

Figure 16:
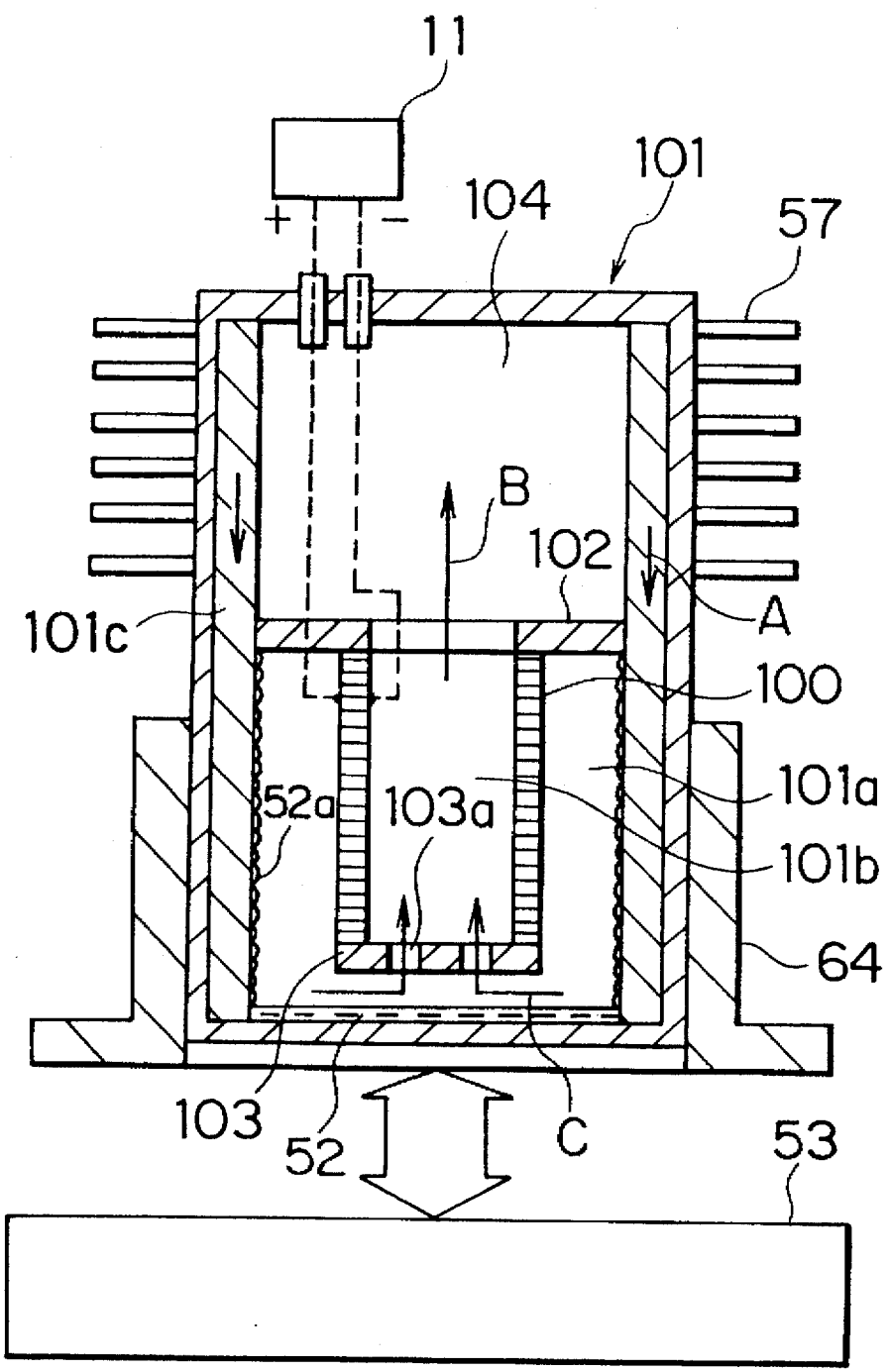
FIG. 16 schematically shows a construction of a water evaporation type cooling system based on an electrolytic reaction according to a ninth embodiment of this invention.

FIG. 16 is a schematic illustration of a structure of a water evaporation type cooling system based on the electrolytic reaction according to a ninth embodiment of this invention. In the illustration, designated at numeral 100 is a solid electrolytic membrane having a cylindrical configuration and having a function to electrolyse water molecules. The solid electrolytic membrane 100 is fitted to a supporting plate 102 to divide a cylindrically configured and hermetically sealed housing (can) 101 with a bottom into two spaces 101a and 101b. A direct-current voltage is made to be applied from a direct-current power source 11 to both surfaces of the solid electrolytic membrane 100. The two spaces 101a and 101b are communicated with each other through ventilation holes 103a made in an end plate 103 attached to the lower end portion of the solid electrolytic membrane 101. Water 52 is put in the bottom portion of the space 101a to soak a lower end portion of a cloth member 101c which is installed along the inner wall of the hermetically sealed housing 101 and which serves as an absorbing member having a mesh-like, a cotton-like or a sponge-like configuration to show a good hydration. Further, the water 52 is absorbed or soaked up into the cloth member 101c on the capillarity phenomenon so that a water film is formed by water 52a on the inner wall surface of the housing constituting the space 101a. A portion of the housing defining the space 101a is thermally coupled to an object 53 being cooled. To an outer surface of a condensing space 104 formed in a portion of the space 101b there is attached a heat radiator 57 which acts as a condensing means to absorb heat from steam in the interior and to radiate the heat to the external. The steam flowing from the space 101b is cooled and condensed into water which in turn, is absorbed by the cloth member 101c placed on the wall surface. In addition, owing to the capillarity phenomenon, the condensed water absorbed by the cloth member 101c moves along an arrow A in the cloth 101c to the inner wall surface of the housing forming the space 101a. Further, within the spaces 101a and 101b there is packed an oxygen gas mixed with steam.

Figure 2:
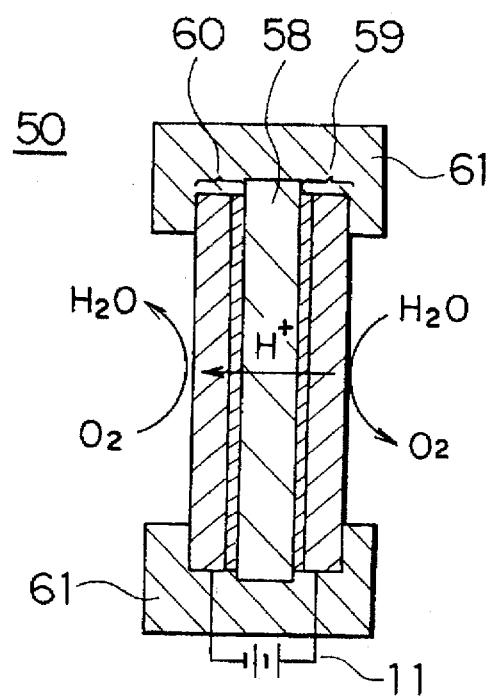
FIG. 2 is a cross-sectional view showing a structure of a solid electrolytic membrane for use in the water evaporation type cooling system based on the electrolytic reaction according to the first embodiment of this invention.

The solid electrolytic membrane 100 is constructed to have the same structure as the solid electrolytic membrane 50 as shown in FIG. 2 except for having the cylindrical configuration. That is, this solid electrolytic membrane 100 is constructed such that an anode 59 and a cathode 60 are respectively located onto outer and inner circumferential surface sides of a cylindrical proton conductor 58 serving as a solid high polymer electrolyte which allows the proton to selectively pass. Further, a resin-made frame 61 holds the proton conductor 58, the anode 59 and the cathode 60, and the anode 59 and the cathode 60 are securely fixed onto both surfaces of the proton conductor 58, respectively. As the proton conductor 58 there is employed a proton exchange membrane (a solid high polymer electrolytic membrane) such as the Nafion-117 (the registered trademark of Du Pont). Still further, the anode 59 and the cathode 60 can be a porous electrode which is constructed with a platinum-plated mesh member made of titanium, tantalum or stainless steel or with a metal-plated member wherein fibers serve as feeders.

Secondly, a description will be taken of an operation of the ninth embodiment of this invention. In response to the application of a direct-current voltage from the direct-current power source 11 to between the anode 59 and the cathode 60, the oxidation/reduction reactions as expressed by the following formulas occur on both the electrode surfaces. At this time, as shown in FIG. 2 H⁺ (proton) produced by the electrolysis on the anode 59 passes through the proton conductor 58 to reach the cathode 60 to produce water. Thus, water is electrolysed at the anode 59 while water is produced at the cathode 60, so that as a whole the steam at the anode 59 side is shifted to the anode 60 side and the oxygen at the cathode 60 side is shifted to the anode 59 side.

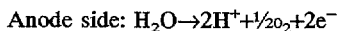
Anode side: $H_2O \rightarrow 2H^+ + \frac{1}{2}O_2 + 2e^-$
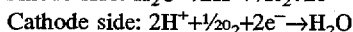
Cathode side: $2H^+ + \frac{1}{2}O_2 + 2e^- \rightarrow H_2O$
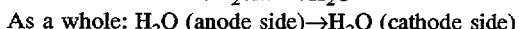
As a whole: $H_2O$ (anode side)$\rightarrow H_2O$ (cathode side)
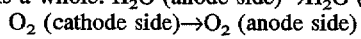
$O_2$ (cathode side)$\rightarrow O_2$ (anode side)

If the solid electrolytic membrane 100 is placed such that the anode 59 is positioned at the space 101a side, due to this reaction, the steam within the space 101a is shifted to the space 101b side whereas the oxygen within the space 101b is shifted to the space 101a side. As a result, the humidity decreases within the space 101a to accelerate the evaporation of the water 52a absorbed in the cloth member 101c installed on the inner wall surface of the housing constituting the same space, thus inducing the temperature drop.

Since the housing making up this space 101a is thermally coupled to the object 53 being cooled, the heat generated in the interior of the object 53 being cooled is absorbed by the water 52a whose temperature drops within the space 101a, whereas the water 52a evaporates due to the heat absorption. Further, owing to the steam drawing action of the solid electrolytic membrane 100 the steam evaporated is drawn into the space 101b and the space 101a is always maintained to show a low humidity to promote the evaporation of the water 52a. The steam drawn from the space 101a into the space 101b flows along an arrow B into the condensing space 104 coupled as a water passage to the space 101b. The steam put into the condensing space 104 is processed such that its head is radiated through the head radiator 57 to the external to be cooled to turn into condensed water which in turn, is absorbed into the cloth member 101c installed on the inner wall surface of the condensing space 104. In addition, due to the capillarity phenomenon, the condensed water is successively returned along the arrow A into the cloth member 101c installed on the inner wall surface of the space 101a. Thus, the water 52a within the space 101a can be circulated without the use of a mechanical means such as a pump.

On the other hand, owing to the oxygen molecule transferring function the solid electrolytic membrane 100 has in addition to the aforesaid steam drawing function, the oxygen gas within the space 101b is transferred into the space 101a. Whereupon, the pressure within the space 101a rises while the pressure within the space 101b falls, with the result that a pressure difference occurs between both the spaces 101a and 101b. Further, owing to the pressure difference produced between both the spaces 101a and 101b, the oxygen gas within the space 101a is returned through the ventilation holes 103a into the space 101b along an arrow C. Therefore, the mutual steam and oxygen gas transferring operations of the solid electrolytic membrane 100 continues. In this instance, the cooling temperature necessary for the object 53 being cooled varies in accordance with various situations, and hence the cooling system is needed to have a function to arbitrarily set the cooling temperature.

FIG. 4 illustrates the relationship between the boiling evaporation temperature of water and the saturation pressure. As obvious from the illustration, a given cooling temperature can be set in such a manner that the operating pressure of the hermetically sealed housing 101 is fixed so that the water boiling evaporation temperature comes to below the cooling temperature of the object 53 being cooled. For example, in cases where the object 53 being cooled is needed to be cooled to below 50° C., as indicated by a dotted line in FIG. 4 the pressure of a gas containing steam and oxygen may be set so that the pressure within the hermetically sealed housing becomes below the value (0.15 Kg/cm²) indicated by a point P.

Furthermore, a description will be made hereinbelow of the principle that the cooling of the object 53 being cooled is possible with the construction of the cooling system according to this invention. FIG. 5 shows the moisture contents of gases, i.e., the relationship between the wet-bulb temperature and the dry-bulb temperature with respect to the relative humidity when water and gas are in contact condition. The dry-bulb temperature is a temperature of a gas coming into contact with water, and the temperature of water coming into contact with a gas drops to endlessly approach the wet-bulb temperature. For instance, as indicated by a dotted line in FIG. 5, the wet-bulb temperature of a gas having a temperature of 30° C. and a relative humidity of 20% assumes a value (16° C.) indicated by a point Q. Thus, the temperature of the water coming into contact therewith results in dropping toward 16° C. For this reason, if the water coming into a gas with a low humidity is in thermally coupled relation to the object 53 being cooled, the object 53 can be cooled to below the ambient temperature.

FIG. 6 illustrates the operating condition of the FIG. 16 system on an air line chart. In the illustration, assuming that the relative humidity of the space 101a is taken as $x_1$ and its space temperature $t_1$, the thermal condition of the space is shown at a point $P_1$ on the air line chart. Thus, the water 52 coming into contact with the gas with the relative humidity $x_1$ starts to drop along a line L, toward the wet-bulb temperature $t_w$. Further, the water 52 receives heat from the object 53 thermally coupled thereto and hence enters an equilibrium condition at its intermediate temperature. Owing to the action of the solid electrolytic membrane 100, the steam generated in the space 101a is shifted to the space 101b, while the oxygen gas is shifted from the space 101b to the space 101a, with the result that the relative humidity of the space 101a is always maintained to be low.

Likewise, supposing that the relative humidity of the space 101b is taken to be $x_2$ in the saturation state or in the vicinity of the saturation state and the space temperature is taken to be $t_1$, the thermal state of the space is indicated at a point $P_2$ on the air line chart. If the condensation temperature of the condensing space 104 is $t_c$, the thermal state of the gas horizontally shifts from the point $P_2$ to a point $P_d$, while the steam starts to condense and reaches a point $P_c$ when being further cooled, and then returns to the space 101b along a straight line $L_2$, thus taking a state indicated by the point $P_2$. This repetition condenses the steam shifted from the solid electrolytic membrane 100. Owing to the aforesaid electrolytic reaction, the oxygen gas equal in mol to the steam moves between the spaces 101b and 101a in a direction opposite to that of the steam.

As described above, according to the ninth embodiment, the hermetically sealed housing 101 enclosing the oxygen and steam is divided by the solid electrolytic membrane 100 into the spaces 101a and 101b, and the solid electrolytic membrane 100 surface at the space 101a side causes the electrolysis of water while the proton produced by the water electrolysis is supplied through the solid electrolytic membrane 100 to another solid electrolytic membrane 100 surface at the space 101b side so that the production reaction of water occurs on the solid electrolytic membrane 100 surface at the space 101b side to create the difference in humidity between the spaces 101a and 101b, and subsequently the water 52a supplied to the inner wall surface of the space 101a is brought into contact with the gas with a low humidity within the space 101a to reduce the temperature of the water. With this arrangement, the water 52a and the gas can be circulated without the use of a mechanical means such as a pump, thereby providing a noiseless cooling method which does not require a driving mechanism for water circulation.

Moreover, this embodiment is equipped with the solid electrolytic membrane 100 placed to divide the hermetically sealed housing 101 enclosing the oxygen and the steam into the two spaces 101a and 101b, the water 52a supplied into the inner wall surface of the space 101a, the condensing space 104 provided to communicate with the space 101b, the cloth member 101c for setting up a communication between the condensing space 104 and the space 101a, the ventilation holes 103a for making a communication between the gas sections of the spaces 101a and 101b, and the direct-current power source 11 for applying a direct-current voltage to both the surfaces of the solid electrolytic membrane 101. Thus, the system can circulate the water 52a and the gas without the use of a mechanical means such as a pump, and can be constructed with resting devices and with less components. This permits a size reduction and hence allows a microscopic-level or small-scale cooling such as local cooling on an electronic substrate. In addition, this system can be noiseless and can be free from maintenance because of no driving section. Further, since the cooling temperature of the water 52a is adjustable by adjusting the pressure of the gas filled in the hermetically sealed housing 101, the cooling becomes possible in accordance with the cooling temperature needed for the object 53 being cooled. Still further, now that the gas filled in the spaces 101a and 101b is produced with oxygen gas and steam, only factors contributing to the electrolysis exist within the spaces 101a and 101b, thus promoting the reaction and enhancing the cooling ability.

Moreover, according to the ninth embodiment, the solid electrolytic membrane 100 and the spaces 101a and 101b are disposed coaxially about a vertical axis (the axis of the solid electrolytic membrane 100) and the condensing space 104 is placed at the uppermost position while the spaces 101a and 101b are located at lower positions, and further the ventilation holes 103a for returning the oxygen gas from the space 101a to the space 101b is situated at the lowermost position. Thus, the steam has a small specific weight and can easily move upwardly, while the oxygen gas has a great specific weight and moves downwardly. Accordingly, the gas is movable by the difference in specific weight between the steam and oxygen gas without the need for a driving source. Even if the solid electrolytic membrane 100 and the spaces 101a and 101b are coaxially disposed around an axis inclined with respect to the vertical direction, the same effects are also obtainable.

Tenth Embodiment

Figure 17:
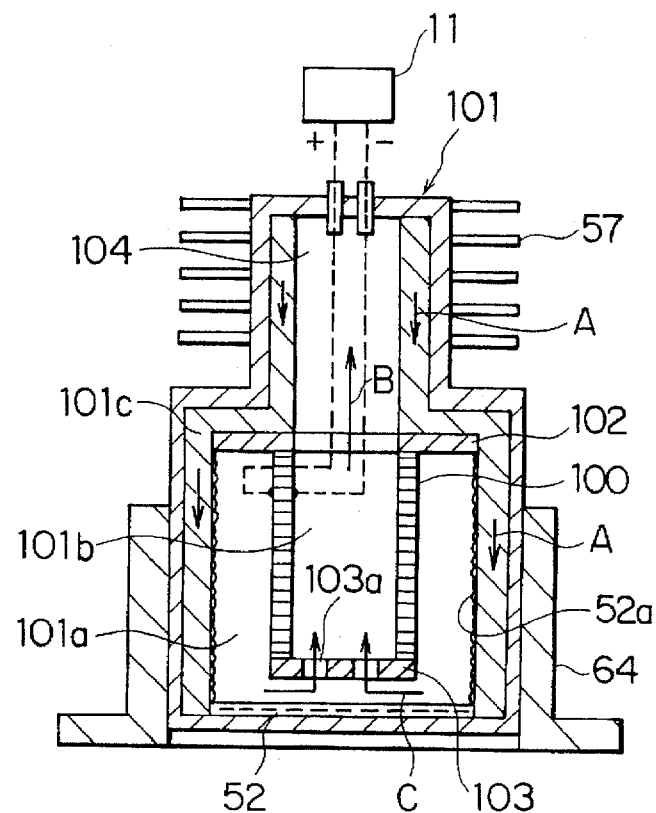
FIG. 17 schematically shows a construction of a water evaporation type cooling system based on an electrolytic reaction according to a tenth embodiment of this invention.

Although in the aforesaid ninth embodiment the hermetically sealed housing 101 has a bottom portion and the same outer diameter dimension in the vertical directions, in the tenth embodiment, as shown in FIG. 17 the hermetically sealed housing 101 similarly has a bottom portion but has different outer diameter dimensions in the vertical directions. That is, in the hermetically sealed housing 101, the outer diameter of a lower section accommodating the solid electrolytic membrane 100 is made to be greater than the outer diameter of an upper section constituting the condensing space 104. With the aforementioned ninth embodiment, in the case that the heat load from the object 53 being cooled is large and there is a need to enlarge the outer diameter of the solid electrolytic membrane 100, then the dimension of the space 101a becomes large. In addition, if the entire hermetically sealed housing 101 is designed to have the same dimension as that of the space 101a, the outer diameter dimension of the condensing space 104 becomes unnecessarily large, thus enlarging the size of the whole system and resulting in being disadvantageous from an economic point of view. On the contrary, according to the tenth embodiment, since the outer diameter dimension of the upper section making up the condensing space 104 is designed to be smaller, the size enlargement of the whole system is suppressible and the aforesaid problem is eliminable.

Eleventh Embodiment

Figure 18:
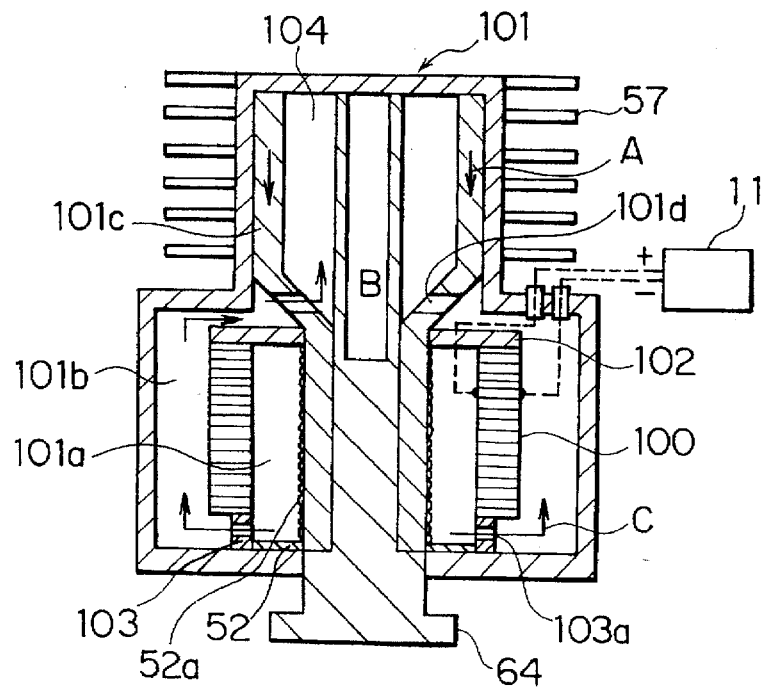
FIG. 18 schematically shows a construction of a water evaporation type cooling system based on an electrolytic reaction according to an eleventh embodiment of this invention.

Although in the above-described ninth embodiment the space 101a humidity-reduced is communicated with the condensing space 104 and placed to surround the space 101b including a large quantity of steam in order to evaporate the water 52a absorbed in the cloth member 101c, in this eleventh embodiment, as shown in FIG. 18 the space 101a is situated inside the space 101b. That is, a cooling plate 64 is coaxially disposed with the hermetically sealed housing 101 so that its lower end portion projects from the bottom surface of the hermetically sealed housing 101. Further, in a lower side of the hermetically sealed housing 101, the solid electrolytic membrane 100 is placed to surround the cooling plate 64. In addition, a cloth member 101c is installed along the outer wall surface (outer circumferential surface) of the cooling plate 64 in a lower side of the hermetically sealed housing 101 and successively installed along the inner wall surface (inner circumferential surface) of the hermetically sealed housing 101 in an upper side thereof. The cloth member 101c has steam ventilation holes 101d at its middle portion. With this construction, in a lower side of the hermetically sealed housing 101 there is formed a space 101a surrounded by the solid electrolytic membrane 100 and the cloth member 101c installed on the outer wall surface of the cooling plate 64, and outside the space 101a there is formed a space 101b defined by the solid electrolytic membrane 100 and the hermetically sealed housing 101. In the space 101a, water 52 is stored so as to soak into the lower end portion of the cloth member 101c. In addition, the space 101a is communicated through ventilation holes 103a with the space 101b, and the space 101b is communicated through the ventilation holes 101d with a condensing space 104 made in an upper side of the hermetically sealed housing 101.

In this eleventh embodiment, the heat of the object 53 being cooled is transmitted through the cooling plate 64 and is absorbed by water 52a in the cloth member 101c installed on the outer wall surface of the cooling plate 64. Thus, the object 53 being cooled is cooled while the water 52a is evaporated due to the heat absorption. Further, the steam evaporated is drawn into the space 101b due to the steam drawing action of the solid electrolytic membrane 100 so that the space 101a is always kept to shows a low humidity to accelerate the evaporation of the water 52a. The steam drawn into the space 101b due to the steam drawing action of the solid electrolytic member 100 is shifted through the ventilation holes 101d into the condensing space 104 and then condensed by the radiation action of the heat radiator 57 and further absorbed in the cloth member 101c installed on its inner wall surface. Further, the water absorbed into the cloth member 101c within the condensing space 104 moves along an arrow A up to the cloth member 101c installed on the outer wall surface of the cooling plate 64 due to the capillarity phenomenon of the cloth member 101c, thus returning to the space 101a.

On the other hand, owing to the oxygen molecule transferring function that the solid electrolytic membrane 100 has concurrent with the aforesaid steam drawing action, the oxygen gas within the space 101b is shifted to the space 101a. Accordingly, the pressure within the space 101a increases while the pressure within the space 101b decreases, thus producing a difference in pressure therebetween. Due to this pressure difference therebetween, the oxygen gas within the space 101a is returned through the ventilation holes 103a into the space 101b along an arrow C, with the result that the mutual steam and oxygen gas transferring operations of the solid electrolytic membrane 100 continue.

According to this eleventh embodiment, since as described above the space 101a is formed inside the space 101b, the cooling plate 64 can be located on the axis of the hermetically sealed housing 101, that is, the cooling plate 64 can be concentrated locally in a narrow range. Thus, according to this eleventh embodiment, in addition to the effects of the above-described ninth embodiment, it is possible to effectively cool a small object 53 being cooled and a local heating portion. In addition, since the cloth member 101c is installed to come into contact with the outer wall surface of the cooling plate 64, the heat of the cooling plate 64 is absorbed by the water 52a in the cloth member 101c so that the cooling plate 64 is cooled quickly.

Twelfth Embodiment

Figure 19:
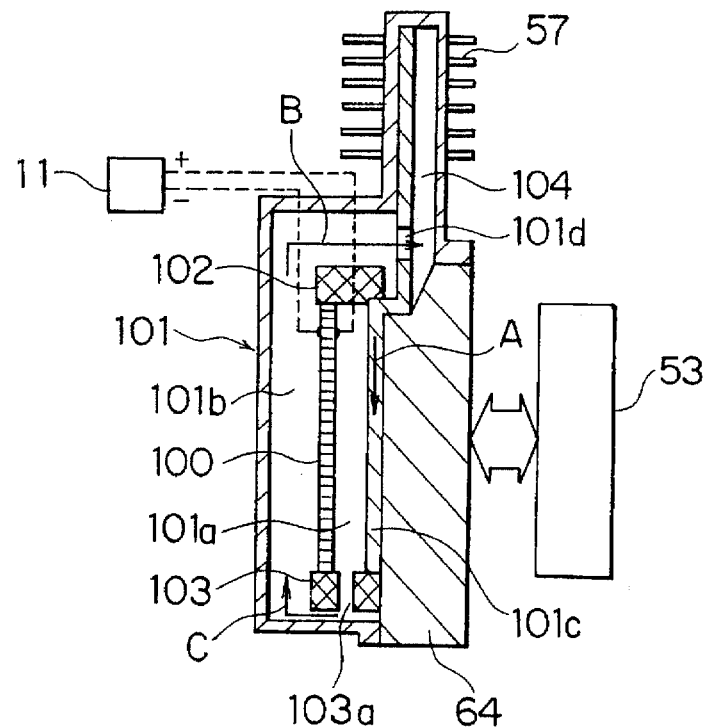
FIG. 19 schematically shows a construction of a water evaporation type cooling system based on an electrolytic reaction according to a twelfth embodiment of this invention.

Although in the above-described ninth embodiment the hermetically sealed housing 101 is constructed to be symmetrical with respect to its axis, in this twelfth embodiment, as shown in FIG. 19 the hermetically sealed housing 101 is constructed to have a polygon configuration and the solid electrolytic membrane surface or the cooling surface is not provided with respect to all its surfaces but is provided with respect to one surface or several surfaces (not shown). In this case, the same effects are also obtainable. This structure permits the configurations of the hermetically sealed housing 101 to be determined in accordance with the fitting conditions for cooling the object 53 being cooled.

Thirteenth Embodiment

Figure 20:
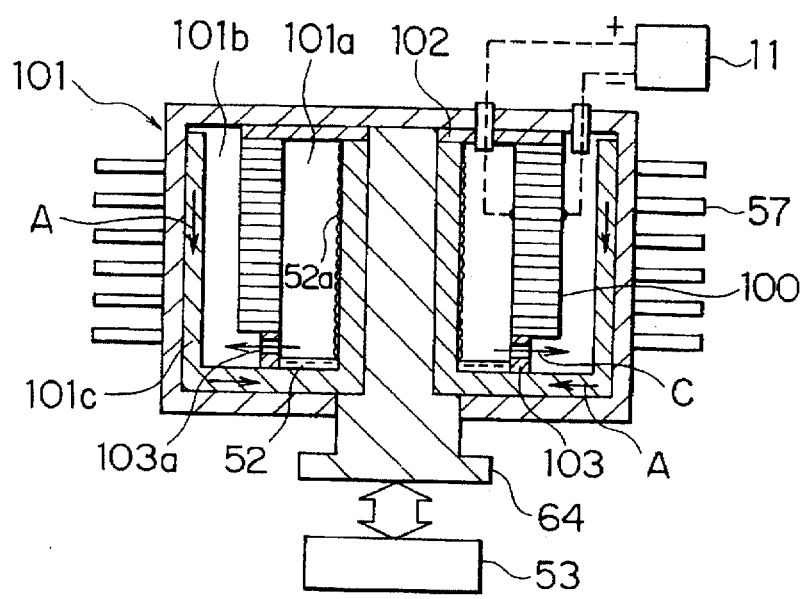
FIG. 20 schematically shows a construction of a water evaporation type cooling system based on an electrolytic reaction according to a thirteenth embodiment of this invention.

Although, in the above-described eleventh embodiment, in order to evaporate the water 52a absorbed in the cloth member 101c the space 101a humidity-reduced is situated inside the space 101b including a large quantity of steam in the lower side of the hermetically sealed housing 101 and the condensing space 104 communicated with the space 101b is placed in the upper side of the hermetically sealed housing 101, in this thirteenth embodiment as shown in FIG. 20 a space 101b placed outside of a space 101a is constructed as a condensing space 104. That is, the lower end portion of a cooling plate 64 is disposed coaxially with a hermetically sealed housing 101 to protrude from the bottom surface of the hermetically sealed housing 101. In addition, a solid electrolytic membrane 100 is disposed so as to enclose the cooling plate 64. Further, a cloth member 101c is successively installed from the outer wall surface of the cooling plate 64 through the inner bottom surface of the hermetically sealed housing 101 up to the inner wall surface of the hermetically sealed housing 101. Still further, a heat radiator 57 is attached onto the outer wall surface of the hermetically sealed housing 101. With this structure, the space 101a is defined by the solid electrolytic membrane 100 and the cloth member 101c installed on the outer wall surface of the cooling plate 64 while the space 101b is formed outside the space 101a to be surrounded by the solid electrolytic membrane 100 and the hermetically sealed housing 101. Within the space 101a, water 52 is kept to soak into the lower end portion of the cloth 101c. The space 101a is coupled through the ventilation holes 103a to the space 101b. The space 101b is, on its outer wall surface, equipped with the heat radiator 57 to also serve as a condensing space.

In this thirteenth embodiment the heat of the object 53 being cooled is transmitted through the cooling plate 64 and is absorbed by water 52a in the cloth member 101c installed on the outer wall surface of the cooling plate 64. Whereupon, the object 53 being cooled is cooled while the water 52a is evaporated due to the heat absorption. The steam evaporated is drawn into the space 101b due to the steam drawing action of the solid electrolytic membrane 100 and the space 101a is kept to show a low humidity to promote the evaporation of the water 52a. Further, within the space 101b, the steam drawn due to the steam drawing action of the solid electrolytic membrane 100 is condensed by the heat radiating action of the heat radiator 57 and absorbed into the cloth 101c installed on its inner wall surface. In addition, the steam (water) drawn in the cloth member 101c within the space 101b moves along an arrow A up to the cloth member 101c installed on the outer wall surface of the cooling plate 64 by the capillarity phenomenon of the cloth member 101c, thus resulting in returning to the space 101a.

On the other hand, owing to the oxygen gas transferring function that the solid electrolytic membrane 100 has simultaneously with the aforesaid steam drawing function, the oxygen gas within the space 101b is transferred into the space 101a, whereby the pressure within the space 101a rises and the pressure within the space 101b falls, thus producing a difference in pressure therebetween. Further, due to this pressure difference therebetween, the oxygen gas within the space 101a is returned through the ventilation holes 103a into the space 101b along an arrow C. Accordingly, the mutual steam and oxygen gas transferring operations of the solid electrolytic membrane 100 continue.

As described above, according to this thirteenth embodiment, since the space 101a is located inside the space 101b and the heat radiator 57 is provided on the outer wall surface of the hermetically sealed housing 101 so that the space 101b also acts as the condensing space 104, in addition to the effects of the above-described eleventh embodiment, it is possible to shorten the axial dimension, and this structure is effective particularly when there is a need to reduce its height because of limitations on fitting.

Fourteenth Embodiment

Although in the above-described ninth embodiment the solid electrolytic membrane with a cylindrical configuration is used to separately form the two spaces 101a and 101b, in this fourteenth embodiment, being not shown in the illustration, first and second solid electrolytic membranes constructed as well as the solid electrolytic membrane but different in diameter are coaxially disposed to form a hermetically sealed space therebetween to separately establish two spaces 101a and 101b. In this case, the first solid electrolytic membrane is positioned at the space 101a side whereas the second solid electrolytic membrane is positioned at the space 101b side. In this fourteenth embodiment, like the above-described fifth embodiment the hermetically sealed space formed between the first and second solid electrolytic membranes sets up a low-humidity gas space, and an electromotive force takes place between the electrodes provided both the surfaces of the second solid electrolytic membrane.

According to this fourteenth embodiment, in addition to the effects of the above-mentioned ninth embodiment, due to the aforesaid hermetically sealed space being the low-humidity gas space it is possible to enhance the cooling performance by blocking the reverse movement of the steam from the space 101b to the space 101a. Moreover, with the electromotive force taking place between the electrodes provided on both the surfaces of the second solid electrolytic membrane being recovered and reclaimed, an energy-saving system is attainable.

Fifteenth Embodiment

Although in the above-described ninth embodiment the cylindrical solid electrolytic membrane 100 is used to separately establish the two spaces 101a and 101b, in this fifteenth embodiment, being not shown in the illustration, a first cylindrical solid electrolytic membrane constructed as well as the solid electrolytic membrane 100 and a second cylindrical solid electrolytic membrane having an electrical short circuit formed in the interior of a high polymer electrolytic membrane are coaxially disposed to form a hermetically sealed space therebetween to thus separately establish two spaces 101a and 101b. The first solid electrolytic membrane is positioned at the space 101a side whereas the second solid electrolytic membrane is positioned at the space 101b side.

According to this fifteenth embodiment, as well as the above-mentioned sixth embodiment the improvement of the dehumidification ability is possible and an excellent oxygen concentration ability is attainable.

Although in the above-described embodiments the purpose is to reduce the size of the system, if a large-sized solid electrolyte is built in to enlarge the electrolytic reaction area, it is possible to an air-conditioning system which is resting, noiseless and which is free from maintenance.

Sixteenth Embodiment

Figure 21:
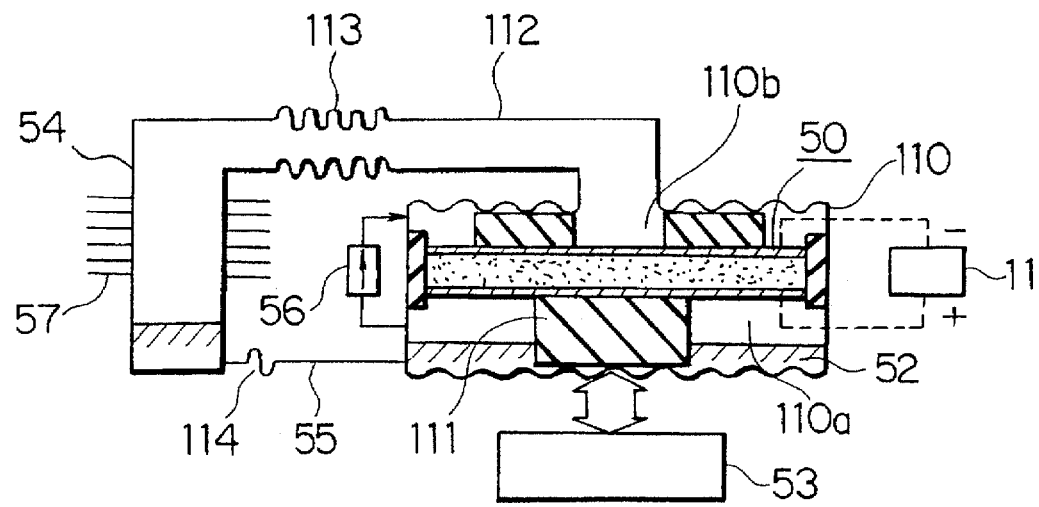
FIG. 21 schematically shows a construction of a water evaporation type cooling system based on an electrolytic reaction according to a sixteenth embodiment of this invention.

FIG. 21 is a schematic illustration of a structure of a water-evaporation type cooling system based on an electrolytic reaction according to a sixteenth embodiment of this invention. In the illustration, a hermetically sealed housing 110 is made from a flexible stainless steel plate having a thickness of approximately 0.3 mm and processed to, for example, have a wave-like surface configuration or a microscopic irregular surface configuration. Further, a solid electrolytic membrane 50 is provided to divide the hermetically sealed housing 110 into two spaces 110a and 110b being first and second hermetically sealed spaces. In addition, a spacer 111 made of an insulating high polymer resin is situated between an inner wall surface of the hermetically sealed housing 110 and the solid electrolytic membrane 50. Still further, the spaces 110a and 110b are filled with oxygen gas. The space 110b of the hermetically sealed housing 110 is communicated through a ventilation pipe 112 with a condenser 54. In the middle of this ventilation pipe 112 there is fitted a flexible member such as a bellows 113. Also in the middle of a water passage 55 there is fitted a flexible member such as a bellows 114. Other structures are the same as in the above-described first embodiment.

Figure 22:
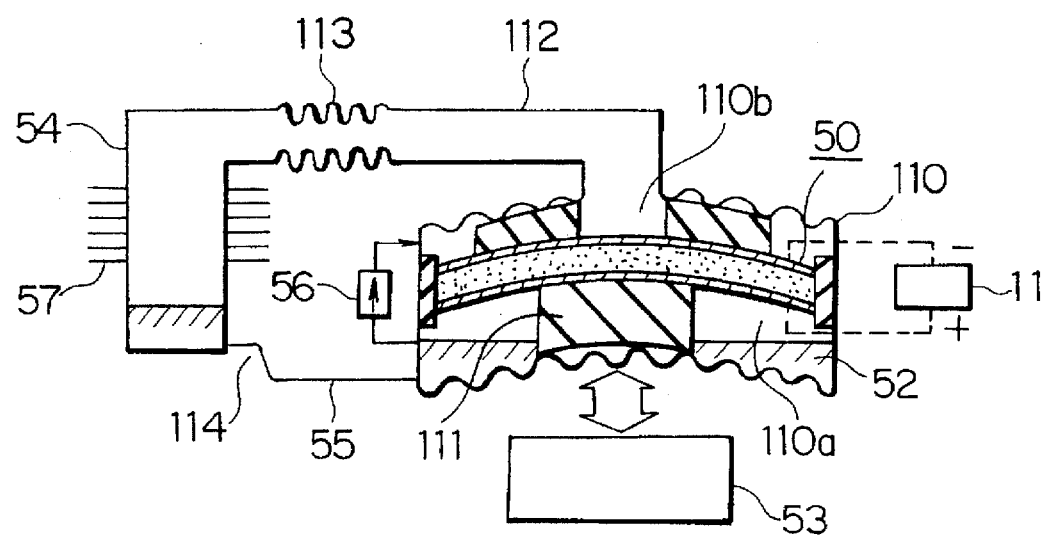
FIG. 22 schematically shows a used state of the water evaporation type cooling system based on the electrolytic reaction according to the sixteenth embodiment of this invention.

In this sixteenth embodiment, since the hermetically sealed housing 110 is manufactured with a flexible material, when both its end portions are held and bent, its external form can be bent as shown in FIG. 22. Further, the solid electrolytic membrane 50 has an appropriate separation from the hermetically sealed housing 110 by means of the spacer 111. In addition, because of the deformation of the hermetically sealed housing 110, the end portions of the hermetically sealed housing 110 lowers relatively with respect to the condenser 54. In accordance with the relative displacement of the hermetically sealed housing 110 and the condenser 54, the stress to be applied to the water passage 55 is suppressible owing to the deformation of the flexible member 114. In addition, due to the deformation of the flexible member 113 fitted in the ventilation pipe 112, the condenser 54 can arbitrarily take the positional relationship to the hermetically sealed housing 110 vertically and horizontally. At this time, the flexible member 114 fitted in the water passage 55 deforms in conformity with the relative deformation of the hermetically sealed housing 110 and the condenser 54.

The cooling operation of the water evaporation type cooling system according to this sixteenth embodiment is the same as that of the above-described first embodiment. For this reason, this sixth embodiment can have the same effects as those of the above-described first embodiment. In addition, since the hermetically sealed housing 110 has a flexibility and hence is deformable, the bottom portion of the hermetically sealed housing 110 coming into contact with the water 52, i.e., the external form of the cooling section, is deformable in conformity with the configuration of the cooled surface of the object 53 being cooled, thus allowing the tight contact between the cooled surface and the cooling section. Thus, an excellent thermal connection between the cooling section of the hermetically sealed housing 110 and the object 53 being cooled becomes possible irrespective of the configuration of the cooled surface of the object 53 being cooled, thereby improving the cooling efficiency. Moreover, with the deformation of the flexible members 113 and 114, the relative positional relationship between the hermetically sealed housing 110 and the condenser 54 can arbitrarily be set. Accordingly, the condenser 54 can be placed at an optional position regardless of the position of the object 53 being cooled, and hence the degree of freedom on the installation of the water-evaporation type cooling system can increase.

Although in the sixteenth embodiment the hermetically sealed housing 110 is manufactured with a stainless steel plate which is processed to have a wave-like configuration or a microscopic irregular configuration and to have a thickness of approximately 0.3 mm, the hermetically sealed housing 110 is not limited to this structure as long as it is made to be deformable, and it is also possible that it is manufactured with a flexible metallic plate or a cloth member with no permeability. As one example of the cloth member with no permeability, there is a cloth rubber-lining-processed.

Seventeenth Embodiment

Figure 23:
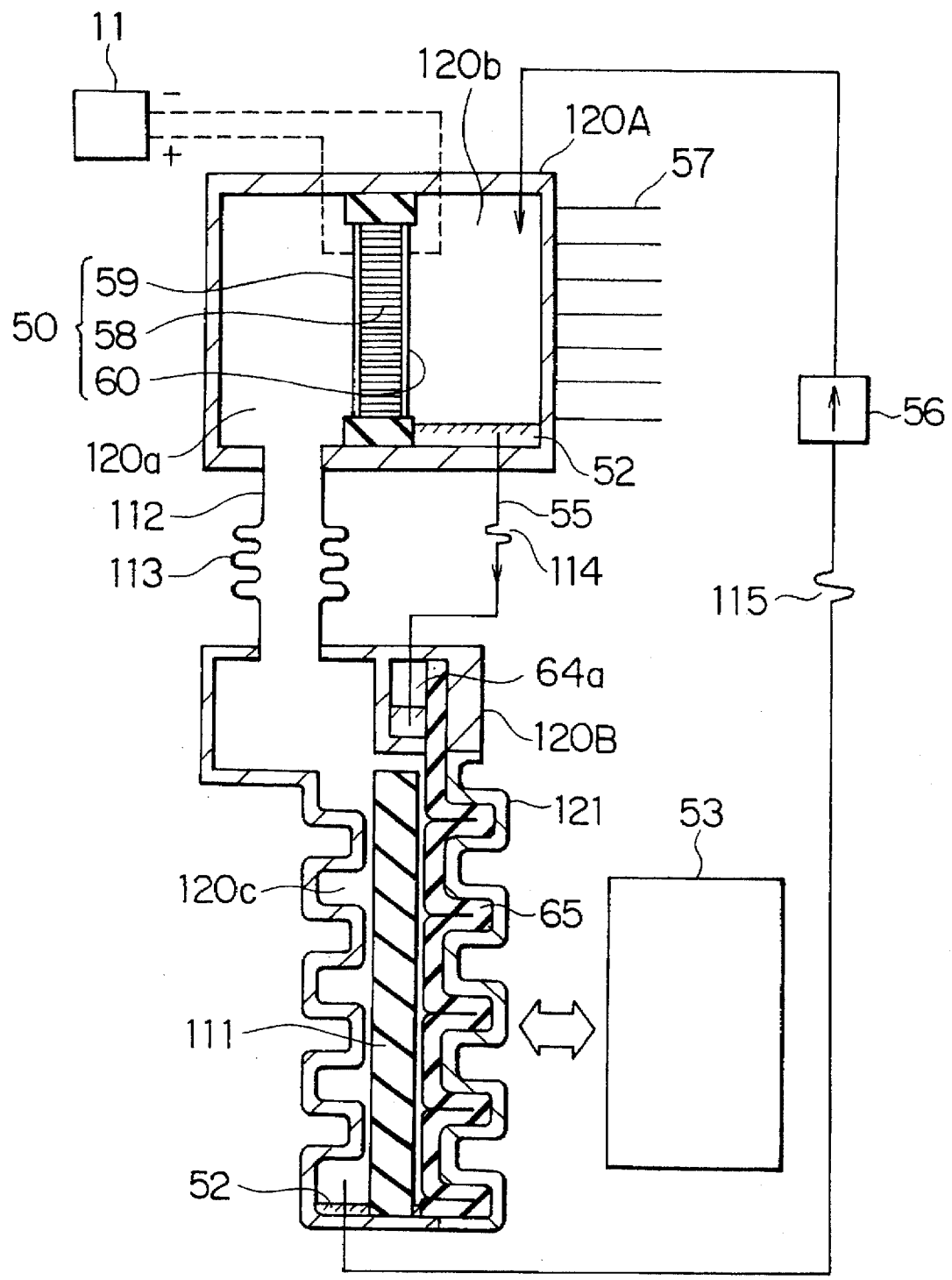
FIG. 23 schematically illustrates a construction of a water evaporation type cooling system based on an electrolytic reaction according to a seventeenth embodiment of this invention.

FIG. 23 is a schematic illustration of a structure of a water-evaporation type cooling system based on an electrolytic reaction according to a seventeenth embodiment of this invention. In the illustration, a first hermetically sealed housing 120A and a second hermetically sealed housing 120B are disposed vertically, and a solid electrolytic membrane 50 is placed to divide the interior of the hermetically sealed housing 120A into two spaces 120a and 120b. Water 52 is reservoired in the bottom portion of the space 120b, and a heat radiator 57 is attached onto the outer surface of the first hermetically sealed housing 120A at the space 120b side. Further, a cooling plate 121 thermally coupled to the object 53 being cooled is integrally fitted onto one side surface of the second hermetically sealed housing 120B. The cooling plate 121 and the second hermetically sealed housing 120B are manufactured with a flexible stainless steel plate which has a thickness of approximately 0.3 mm and which is processed to have a wave-like configuration or a microscopic irregular configuration. In addition, a condensed water reservoir portion 64a is provided at an upper side of the second hermetically sealed housing 120B, and a spacer 111 made of an insulating high polymer resin is placed within the second hermetically sealed housing 120B to form a space 120c. On the inner surface of the cooling plate 121 there is formed a water-containing layer 65 constructed with a porous plate, a mesh-like plate, a film-like member or the like which has a good thermal conduction property and a water absorption property. The upper end portion of this water-containing layer 65 is located within the condensed water reservoir portion 64a so that the water-containing layer 65 absorbs the water 52 within the condensed water reservoir portion 64a to be kept in a wet condition.

Furthermore, the space 120a of the first hermetically sealed housing 120A and the space 120c of the second hermetically sealed housing 120B are communicated through a ventilation pipe 112 with each other. A flexible member 113 is fitted in the middle of the ventilation pipe 112, and a water reservoir portion of the space 120b is communicated through a water passage 55 with the condensed water reservoir portion 64a. A flexible member 114 is fitted in the middle of the water passage 55. In addition, the gas section of the space 120b is coupled through a differential type ventilation mechanism 56 to the gas section of the space 120c. Further, a flexible member 115 such as a bellows is also fitted in a pipe line of the differential type ventilation mechanism 56.

The space 120a organizes a first hermetically sealed space, the space 120b constitutes a second hermetically sealed space, and the space 120c makes up a third hermetically sealed space. Oxygen gas is packed in the spaces 120a, 120b and 120c. The water 52 absorbed in the water-containing layer 65 corresponds to the water stored within the first hermetically sealed space.

Secondly, a description will be taken hereinbelow of the operation of the seventeenth embodiment. When a direct-current voltage from a direct-current power source 11 is applied to between an anode 59 and a cathode 60, water electrolysis takes place in the anode 59 to produce H+ (proton). This proton passes through a proton conductor 58 to reach the cathode 60 to contribute to the production of water. Thus, the steam within the space 120a is transferred into the space 120b while the oxygen within the space 120b is transferred into the space 120a. In this case, the water-containing layer 65 absorbs the water 52 reservoired within the condensed water reservoir portion 64a to get into a wet condition. Accordingly, the steam within the spaces 120a and 120c is transferred through the solid electrolytic membrane 50 into the space 120b so that the humidities within the spaces 120a and 120c fall, with the result that the evaporation of the water absorbed in the water-containing layer 65 is accelerated to induce the reduction of temperature. In addition, the temperature of the cooling plate 121 coming into contact with the water-containing layer 65 declines. Further, since the cooling plate 121 is thermally coupled to the object 53 being cooled, the heat generated within the interior of the object 53 being cooled is absorbed by the cooling plate 121 and the water whose temperature drops and which is absorbed in the water-containing layer 65. Thus, the steam evaporated is drawn into the space 120b due to the steam drawing action of the solid electrolytic membrane 50 so that the spaces 120a and 120c are always maintained to be in a low-humidity condition, thus accelerating the evaporation of water. The heat of the steam drawn into the space 120b is radiated through the heat radiator 57 toward the external, with the result that the steam is cooled to turn into condensed water and to stay in the bottom portion of the space 120b. The water reservoired in the bottom portion of the space 120b is successively returned through the water passage 55 into the condensed water reservoir portion 64a. The water 52 stored in the condensed water reservoir portion 64a is absorbed by the water-containing layer 65. Thus, the water 52 can be circulated without the need for a mechanical means such as a pump.

On the other hand, owing to the oxygen molecule transferring function that the solid electrolytic membrane 50 in addition to the aforesaid steam drawing action, the oxygen gas within the space 120b is transferred to the spaces 120a and 120c. Thus, the pressures within the spaces 120a and 120c rise while the pressure within the space 120b falls, thereby producing a difference in pressure therebetween. Further, when this pressure difference exceeds the operating pressure of the differential type ventilation mechanism 56, the oxygen gases within the spaces 120a and 120c return to the space 120b. As a result, the solid electrolytic membrane 50 maintains the mutual movement operations of the steam and oxygen gas.

Furthermore, since the cooling plate 121 and the second hermetically sealed housing 120B are manufactured with a flexible stainless steel plate which has a thickness of approximately 0.3 mm and which is processed to have, for example, a wave-like surface configuration or a microscopic irregular surface configuration, they are deformable in conformity with the cooled surface of the object 53 being cooled. At this time, the spacer 111 ensures an appropriate gap between the second hermetically sealed housing 120B and the cooling plate 121. The object 53 being cooled is tightly brought into contact with the cooling plate 121 and then is cooled. Further, the relative relationship between the first and second hermetically sealed housings 120A and 120B is changeable by the deformations of the flexible members 113, 114 and 115.

Thus, this seventeenth embodiment 17 can produce the same effects as those of the above-mentioned sixteenth embodiment. In addition, in this seventeenth embodiment the second hermetically sealed housing 120B equipped with the cooling plate 121 is separated from the first hermetically sealed housing 120A accommodating the solid electrolytic membrane 50. For this reason, there is no need for the solid electrolytic membrane 50 to be deformed in conformity with the external form of the object 53 being cooled, with the result that the steam drawing action and oxygen molecule transferring function of the solid electrolytic membrane 50 become long stable, thus lengthening the system life.

Although in this seventeenth embodiment the second hermetically sealed housing 120B is produced using a stainless steel plate which has a thickness of approximately 0.3 mm and which is processed to have a wave-like surface configuration or a microscopic irregular surface configuration, the second hermetically sealed housing 120B is not limited to this provided that it is deformable. For example, it can be manufactured with a flexible metallic plate or a cloth member with no permeability. As one example of the cloth member with no permeability, there is a cloth rubber-lining-processed.

Eighteenth Embodiment

Figure 24:
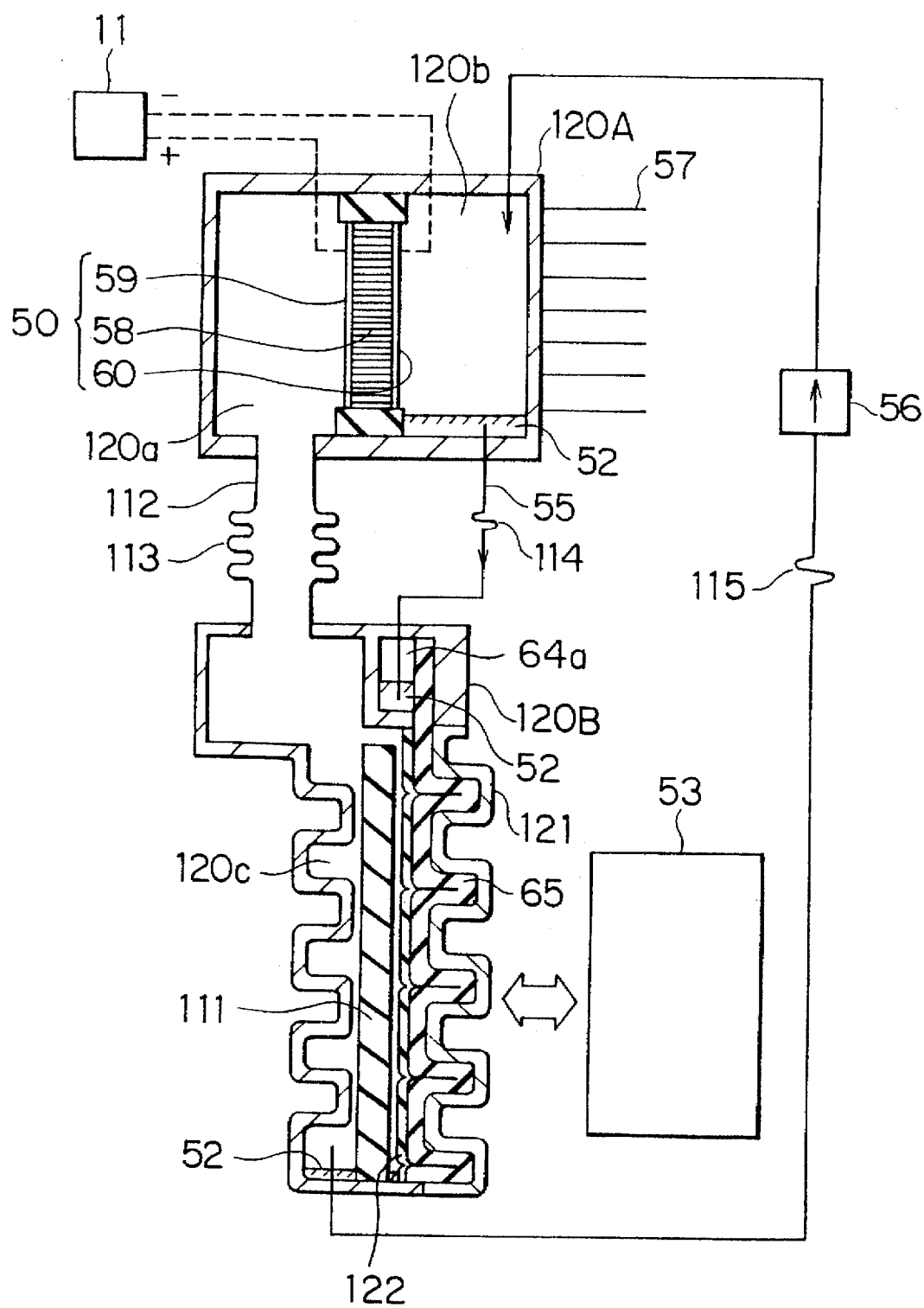
FIG. 24 schematically illustrates a construction of a water evaporation type cooling system based on an electrolytic reaction according to an eighteenth embodiment of this invention.
Figure 25:
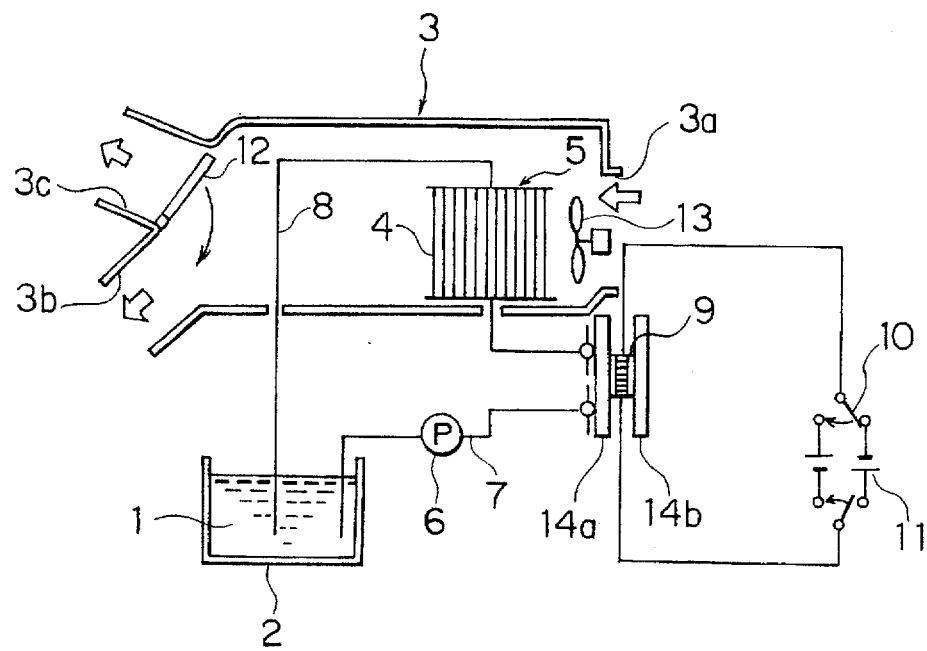
FIG. 25 is an illustration of a construction of a prior steam transmission membrane type dehumidifier system.
Figure 26:
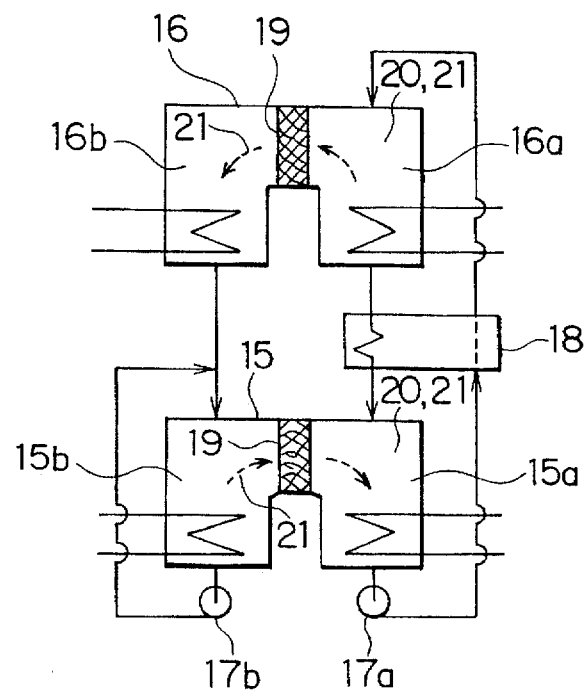
FIG. 26 is an illustration of a structure of a prior absorption type temperature regenerator using a hydrophobic porous membrane.
Figure 27:
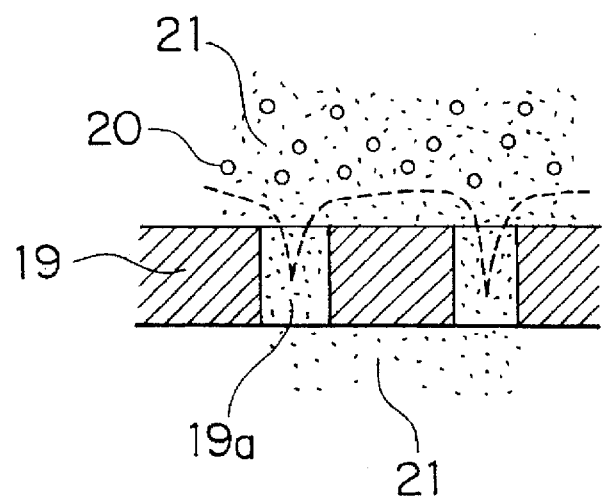
FIG. 27 is a cross-sectional view for describing a gas and liquid separation due to the selective transmission of steam through the hydrophobic porous membrane.
Figure 28:
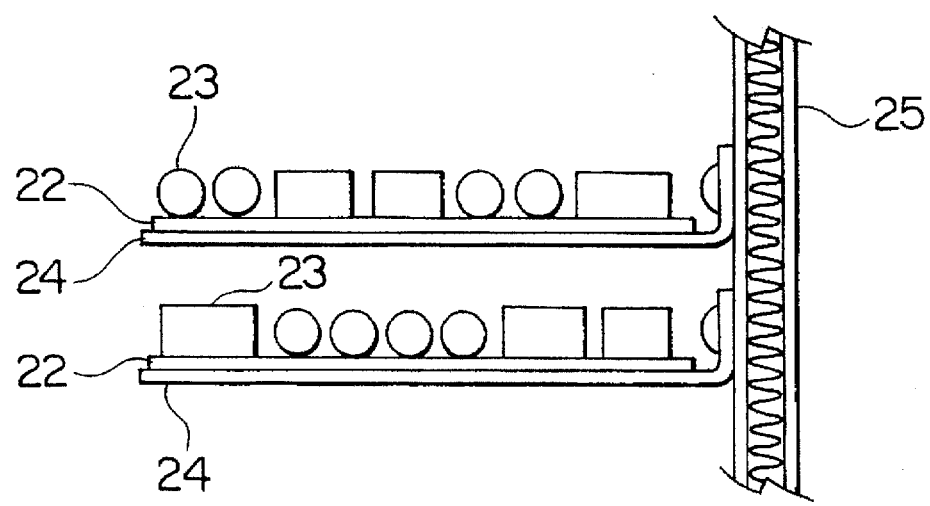
FIG. 28 is an illustration for describing a prior cooling method for an electronic circuit substrate.

In this eighteenth embodiment, as shown in FIG. 24 a steam transmission membrane 122 is coated on a water-containing layer 65. Other structures are the same as those of the above-described seventeenth embodiment. The steam transmission membrane 122 allows the selective transmission of only steam and, for example, is produced with a high polymer film having a large number of fine holes. The diameter of each hole is greater than that of the molecule of steam but is smaller than that of liquid water molecule.

In the case of this kind of cooling system, the cooled surface needed is large, and when the area of the cooling plate 121 is large, unequal water passage occurs and a dry surface is partially produced, with the result that the cooling effect partly deteriorates. On the contrary, according to this eighteenth embodiment, the water 52 absorbed from the condensed water reservoir portion 64a into the water-containing layer 65 due to the capillarity phenomenon turns into steam and passes through the steam transmission membrane 122 to come in the space 120c. Thus, the moisture content of the water-containing layer 65 can increase with the steam transmission membrane 122, with the result that the whole surface of the water-containing layer 65 can be prevented from running out of water and hence a sufficient cooling effect is obtainable irrespective of a large cooling surface.

Although the above-described sixteenth to eighteenth embodiments include the solid electrolytic membrane 50, in place of the solid electrolytic membrane 50 it is also possible to use the first and second solid electrolytic membranes 50a and 50b as shown in FIG. 10 or to use the first and second solid electrolytic membranes 50a and 50b as shown in FIG. 12. Further, although in the above-described seventeenth embodiment and eighteenth embodiment the cooling plate 121 thermally coupled to the object 53 being cooled is attached to one side surface of the second hermetically sealed housing 120B, it is also appropriate that a water-containing layer 65 is securely fixed onto one side inner surface of the second hermetically sealed housing 120B and the one side surface of the second hermetically sealed housing 120B to which the water-containing layer 65 is attached is thermally coupled to the object 53 being cooled. In this instance, the cooling plate 121 is omissible. Still further, although in the seventeenth and eighteenth embodiments the condensed water reservoir portion 64a is located at the upper side of the second hermetically sealed housing 120B, it is also possible that the condensed water reservoir portion 64a is placed at a bottom portion of the second hermetically sealed housing 120B and the lower end side of the water-containing layer 65 is under the condensed water reservoired within the condensed water reservoir portion 64a to draw the water by the capillarity phenomenon so that the water-containing layer 65 is kept in a wet condition.

According to the present invention, porous electrodes are provided on both surfaces of a solid high polymer electrolyte allowing proton to selectively pass, and the cooling system is equipped with a solid electrolytic membrane for dividing a gas-packed hermetically sealed space into first and second hermetically sealed spaces, water reservoired within the first hermetically sealed space, condensing means for condensing water contained in a gas within the second hermetically sealed space, water returning means for returning condensed water, condensed by the condensing means, to the first hermetically sealed space, differential pressure type ventilation means for allowing a ventilation between gas sections of the first and second hermetically sealed spaces when a difference in pressure between the gas sections of the first and second hermetically sealed spaces exceeds an operating pressure, and a direct-current power source for applying a direct-current voltage to between the porous electrodes provided on both the surfaces of the solid electrolytic membrane. This arrangement can provide an electrolytic reaction based water evaporation type cooling system which is of the small-sized, resting type that has a high efficiency and that is free from maintenance.

Furthermore, the solid electrolytic membrane is constructed such that first and second electrolytic membranes each having porous electrodes on both surfaces of its solid high polymer electrolyte selectively allowing transmission of proton are arranged in series in a moving direction of the proton to hermetically seal a space therebetween, and the direct-current power source is made to apply the direct-current voltage to the porous electrodes provided on both the surfaces of the first solid electrolytic membrane being in opposed relation to the first hermetically sealed space. Thus, the gas space formed between the first and second solid electrolytic membranes works to block the reverse movement of steam to thereby suppress the impairment of steam movement efficiency and to accordingly improve the cooling performance.

An electromotive force generated between the porous electrodes on both the surfaces of the second solid electrolytic membrane is recovered and returned as a portion of the power to be supplied to between the porous electrodes on both the surfaces of the first solid electrolytic membrane, thus providing an energy-saving system.

In addition, the solid electrolytic membrane is constructed such that a first solid electrolytic membrane having porous electrodes on both surfaces of its a solid high polymer electrolyte selectively allowing the transmission of protons and a second solid electrolytic membrane made to simultaneously allow the movements of protons and electrons are arranged in series in a moving direction of the protons to hermetically seal a space therebetween, and the direct-current power source applies a direct-current voltage to between the porous electrodes on both the surfaces of the first solid electrolytic membrane being in opposed relation to the first hermetically sealed space. Thus, the gas space formed between the first and second solid electrolytic membranes works to block the reverse movement of steam to thereby suppress the impairment of steam movement efficiency and to accordingly improve the cooling performance. In addition, since the second solid electrolytic membrane is constructed with a single pole to allow the simultaneous movements of protons and electrons, it is possible to simplify the system and to decrease its cost.

In addition, gas stirring means is provided within the -gas sections of the first and second hermetically sealed spaces, by which gas stirring means the gases within the first and second hermetically sealed spaces flow by force to effectively come into contact with the electrolytic reaction surface of the solid electrolytic membrane, thereby promoting the electrolytic reaction to improve the cooling performance.

Furthermore, a cooling section of a housing constituting the first thermetically sealed space is constructed with a flexible member so that the external form of the cooling section is deformable in conformity with the appearance of an object being cooled which is thermally coupled to the cooling section. Whereupon, the cooling section of the housing can excellently be brought into contact with the object being cooled irrespective of the external form of the object being cooled. This improves the cooling efficiency.

Moreover, the condensing means comprises a condenser coupled through a ventilation pipe to the second hermetically sealed space and at least a portion of the ventilation pipe is constructed with a flexible member so that the position of the condenser is variable with respect to the second hermetically sealed space, with the result that the degree of freedom on the installation of the water evaporation type cooling system increases.

Furthermore, a third hermetically sealed space is provided to accommodate a water-containing layer for storing water and to be communicated through a ventilation pipe to the first hermetically sealed space and the condensed water is returned through a water returning means to the water-containing layer. In addition, a cooling section of a housing constituting the third hermetically sealed space is constructed with a flexible member so that the external form of the cooling section is deformable in conformity with the external form of the object being cooled which is thermally coupled to the cooling section. Accordingly, the cooling section of the housing can excellently be brought into contact with the object being cooled irrespective of the external form of the object being cooled, which improves the cooling efficiency. Moreover, since the third hermetically sealed space equipped with the cooling section is separated from the space including the solid electrolytic membrane, there is no need for the solid electrolytic membrane to be deformable, and the solid electrolytic membrane can stably exhibit the steam drawing action and oxygen molecule transferring function for a long time, thus resulting in a long service life.

Furthermore, since the steam transmission membrane which blocks the transmission of liquid water but allows the selective transmission of steam is coated on the surface of the water-containing layer, the moisture content of the water-containing layer can be set to a high value and the whole surface of the water-containing layer can be prevented from running out of water so that a sufficient cooling effect is obtainable regardless of a large cooled surface.

In addition, a third hermetically sealed space is provided to accommodate a water-containing layer storing water and to be coupled through a ventilation pipe to the first hermetically sealed space, the condensed water is returned through a water returning means to the water-containing layer, and at least a portion of the ventilation pipe is constructed with a flexible member so that the position of the third hermetically sealed space is variable with respect to the first hermetically sealed space, with the result that the degree of freedom on the installation of the water evaporation type cooling system increases.

Furthermore, a cooling plate thermally coupled to the object being cooled is disposed to face the solid electrolytic membrane to form the first hermetically sealed space, and a water-containing layer is formed on the surface of the cooling plate which is in opposed relation to the solid electrolytic membrane so that the water reservoired in the first hermetically sealed space is supplied to the water-containing layer. Thus, the cooling plate is directly cooled by the water reservoired in the water-containing layer, thereby improving the cooling performance.

In addition, a portion of the cooling plate is constructed to be in opposed relation to the second hermetically sealed space, and a condensed water reservoir portion for storing water condensed by a condensing means is made in a portion of the cooling plate facing the second hermetically sealed space, and further the condensed water reservoir portion and the water-containing layer are arranged to communicate with each other. Accordingly, the circulation of the water is possible without the use of a power and a circulation passage, thus allowing size reduction.

Moreover, the water returning means and the differential pressure type ventilation means permit the gas within the first hermetically sealed space to flow into the second hermetically sealed space when the difference in pressure between the first and second hermetically sealed spaces exceeds a predetermined value, and the first and second hermetically sealed spaces are communicated with each other through a pipe whereby the condensed water within the second hermetically sealed space is returned into the first hermetically sealed space when the aforesaid pressure difference gets below the predetermined value. This pipe has the water circulation function simultaneously with the gas circulation function, thus simplifying the components for the size reduction.

A heat conductor is provided such that it thermally comes into contact with the surface of the solid electrolytic membrane and a portion thereof projects from the hermetically sealed space to the external, and a heat radiator is placed on the portion of the heat conductor which protrudes from the hermetically sealed space to the external. With this arrangement, the heat of the solid electrolytic membrane is radiated to the outside of the system so that the increase in the temperature of the solid electrolytic membrane is suppressible, thus improving the cooling ability.

Furthermore, a gas consisting of oxygen gas and steam is packed in the first and second hermetically sealed spaces, with the result that only the factor which can contributes to the electrolytic reaction exists within the first and second hermetically sealed spaces, which increases the rate of reaction to improve the cooling ability.

Furthermore, porous electrodes are provided on both surfaces of a solid high polymer electrolyte which selectively allows the protons to pass, and the system is provided with a solid electrolytic membrane for dividing a gas-packed hermetically sealed space into first and second spaces, a water-containing membrane formed within the first space, condensing means for condensing the moisture, contained in the gas within the second space, in a condensing space communicated with the second space, water returning means for returning the water condensed by the condensing means to the water-containing membrane made within the first space, a ventilation hole provided to establish a communication between the first and second spaces, and a direct-current power source for applying a direct-current voltage to between the porous electrodes on both the surfaces of the solid electrolytic membrane. This arrangement can provide an electrolytic reaction based water evaporation type cooling system which is of the small-sized, resting and noiseless type that has a high efficiency and that is free from maintenance.

In addition, a mesh-like, cotton-like or sponge-like water absorbing member is provided to successively extend along the wall surface constituting the first space and the wall surface of a member forming the condensing space and the water absorbing member within the condensing space absorbs the water condensed by the condensing means so that the absorbed water moves to the water absorbing member within the first space by the capillarity phenomenon of the water absorbing member to form a water containing membrane within the first space. Thus, the water circulation becomes possible without the need for a mechanical means such as a pump, thus providing a noiseless system.

Furthermore, a cooling plate thermally coupled to the object being cooled is disposed in opposed relation to the solid electrolytic membrane to establish the first space, and a mesh-like, cotton-like or sponge-like water absorbing member is provided on the surface of the cooling plate facing the solid electrolytic membrane to absorb water to form a water-containing membrane. Accordingly, the cooling plate can directly be cooled by the water absorbed by the water-containing member, thereby improving the cooling performance.

In addition, the solid electrolytic membrane is formed to have a cylindrical configuration and is placed such that its axis takes a substantially vertical direction. Further, the first and second spaces are formed coaxially with the axis of the solid electrolytic membrane and a ventilation hole is made at the lowermost position of the hermetically sealed space in the axial direction while the first and second spaces are placed at a lower side of the hermetically sealed space in the axial direction and the condensing space is communicated with the second space and is located at the uppermost section of the hermetically sealed space in the axial direction. With this arrangement, the gas can smoothly move due to the difference in specific weight between steam and oxygen gas without the use of a driving source.

Moreover, the solid electrolytic membrane is made to have a cylindrical configuration and is disposed such that its axis takes the substantially vertical direction, and the first and second spaces are formed to be coaxial with the axis of the solid electrolytic membrane, and further the first space is located inside the second space and the ventilation hole is made in the lowermost portion in the axial direction and a condensing means is disposed at the outer circumferential side of the second space so that the second space serves as a condensing space. This arrangement can reduce the axial dimension.

Furthermore, since a gas consisting of oxygen gas and steam is hermetically packed in the first and second spaces, only the factors contributing to the electrolytic reaction result in existing within the first and second spaces, thus increasing the rate of reaction to improve the cooling ability.

Moreover, the hermetically sealed space including a gas is divided into the first and second spaces by the solid electrolytic membrane having the porous electrodes on both the surfaces of its solid high polymer electrolyte which allows the protons selectively pass, and a direct-current voltage is applied to between the porous electrodes on both the surfaces to cause the water electrolysis on the solid electrolytic membrane surface at the first space side. The protons produced by the water electrolysis is transferred through the solid electrolytic membrane to the solid electrolytic membrane surface at the second space side and the water production reaction takes place on the solid electrolytic membrane surface at the second space side to produce the humidity difference between the first and second spaces to decrease the temperature of the water reservoired in the first space. This arrangement can provide an electrolytic reaction based water evaporation type cooling system which is of the small-sized, resting and noiseless type that has a high efficiency and that is free from maintenance.

In addition, since the high-humidity gas within the second space is condensed to produce the condensed water which in turn, is returned to the first space to add it to the water reservoired within the first space. The circulation of the water is carried out without the use of a mechanical means such as a pump, thus providing a noiseless system.

Furthermore, a portion of the second space is formed in the condensing space having a function to radiate heat to the external and the high-humidity gas within the second space is condensed to produce the condensed water and the condensed water is returned to the first space to be added to the water reservoired within the first space. The circulation of the water is carried out without the use of a mechanical means such as a pump, thus providing a noiseless system.

Still further, a ventilation hole is provided to set up a communication between the first and second spaces so that the oxygen gas produced by the electrolysis of water on the solid electrolytic membrane surface at the first space side returns through the ventilation hole to the second space. The circulation of the oxygen gas is conducted without the use of a mechanical means such as a pump, thus providing a noiseless system.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A water evaporation type cooling system based on an electrolytic reaction, comprising:

a hermetically sealed housing including a gas;

solid electrolytic membrane means placed within said hermetically sealed housing to divide said hermetically sealed housing into first and second hermetically sealed spaces, said solid electrolytic membrane means being constructed such that porous electrodes are provided on surfaces of solid high polymer electrolyte means allowing protons to selectively pass;

water reservoired within said first hermetically sealed space;

condensing means for condensing moisture contained in said gas within said second hermetically sealed space;

water returning means for returning water, condensed by said condensing means, to said first hermetically sealed space;

differential pressure type ventilation means for allowing a communication between gas sections of said first and second hermetically sealed spaces when a difference in pressure between said gas sections of said first and second hermetically sealed spaces exceeds a predetermined operating pressure; and a direct-current power source for applying a direct-current voltage to between said porous electrodes of said solid electrolytic membrane.

2. A water evaporation type cooling system as defined in claim 1, further comprising gas stirring means provided within the gas sections of said first and second hermetically sealed spaces.

3. A water evaporation type cooling system as defined in claim 1, wherein a housing section constituting said first hermetically sealed space is equipped with a cooling section constructed with a flexible member so that an external form of said cooling section is deformable in conformity with an external form of an object being cooled which is thermally coupled to said cooling section.

4. A water evaporation type cooling system as defined in claim 1, wherein said condensing means comprises a condenser coupled through a ventilation pipe to said second hermetically sealed space and at least a portion of said ventilation pipe is constructed with a flexible member so that the position of said condenser is variable with respect to said second hermetically sealed space.

5. A water evaporation type cooling system as defined in claim 1, further comprising a third hermetically sealed space provided to accommodate a water-containing layer for storing water and to be communicated through a ventilation pipe to said first hermetically sealed space, the condensed water being returned through water returning means to said water-containing layer, and a cooling section being provided in a portion of said housing constituting said third hermetically sealed space and being constructed with a flexible member so that the external form of said cooling section is deformable in conformity with the external form of an object being cooled which is thermally coupled to said cooling section.

6. A water evaporation type cooling system as defined in claim 5, further comprising a steam transmission membrane made to block transmission of liquid water but to selectively allow transmission of steam, said steam transmission membrane being coated on a surface of said water-containing layer.

7. A water evaporation type cooling system as defined in claim 1, further comprising a third hermetically sealed space provided to accommodate a water-containing layer for storing water and to be coupled through a ventilation pipe to said first hermetically sealed space, the condensed water being returned through water returning means to said water-containing layer, and at least a portion of said ventilation pipe being constructed with a flexible member so that the position of said third hermetically sealed space is variable with respect to said first hermetically sealed space.

8. A water evaporation type cooling system as defined in claim 1, further comprising a cooling plate thermally coupled to an object being cooled and disposed to face said solid electrolytic membrane means to form said first hermetically sealed space, and a water-containing layer formed on a surface of said cooling plate which is in opposed relation to said solid electrolytic membrane means so that the water reservoired in said first hermetically sealed space is supplied to said water-containing layer.

9. A water evaporation type cooling system as defined in claim 8, wherein a portion of the cooling plate is constructed to be in opposed relation to said second hermetically sealed space, and a condensed water reservoir portion for storing water condensed by said condensing means is made in a portion of said cooling plate facing the second hermetically sealed space, and said condensed water reservoir portion and said water-containing layer are arranged to communicate with each other.

10. A water evaporation type cooling system as defined in claim 1, wherein said water returning means and said differential pressure type ventilation means comprise a pipe making a communication between said first and second hermetically sealed spaces, whereby the gas within said first hermetically sealed space flows into said second hermetically sealed space through said pipe when the difference in pressure between said first and second hermetically sealed spaces exceeds a predetermined value, and the condensed water within said second hermetically sealed space is returned into said first hermetically sealed space through said pipe when the pressure difference gets below the predetermined value.

11. A water evaporation type cooling system as defined in claim 1, wherein the gas packed within said first and second hermetically sealed spaces is a gas consisting of oxygen gas and steam.

12. A water evaporation type cooling system based on an electrolytic reaction, comprising:

a hermetically sealed housing including a gas;

solid electrolytic membrane means placed within said hermetically sealed housing to divide said hermetically sealed housing into first and second spaces, said solid electrolytic membrane means being constructed such that porous electrodes are provided on surfaces of solid high polymer electrolyte means allowing protons to selectively pass;

a water-containing membrane formed within said first space;

condensing means for condensing moisture, contained in the gas within said second space, in a condensing space communicated with said second space;

water returning means for returning water condensed by said condensing means to said water-containing membrane made within said first space;

a ventilation hole provided to establish a communication between said first and second spaces; and a direct-current power source for applying a direct-current voltage to between said porous electrodes on said solid-electrolytic membrane means.

13. A water evaporation type cooling system as defined in claim 12, further comprising a water absorbing member having one of a mesh-like, cotton-like and sponge-like configurations and provided to successively extend along a wall surface constituting said first space and a wall surface of a member forming said condensing space, said water absorbing member within said condensing space being made to absorb water condensed by said condensing means so that the absorbed water moves to said water absorbing member within said first space by the capillarity phenomenon of said water absorbing member to form a water-containing membrane within said first space.

14. A water evaporation type cooling system as defined in claim 12, further comprising a cooling plate thermally coupled to an object being cooled and disposed in opposed relation to said solid electrolytic membrane means to establish said first space, and a water absorbing member having one of mesh-like, cotton-like or sponge-like configurations and provided on a surface of said cooling plate facing said solid electrolytic membrane means to absorb water to form a water-containing membrane.

15. A water evaporation type cooling system as defined in claim 12, wherein said solid electrolytic membrane means is formed to have a cylindrical configuration and is placed such that its axis takes a substantially vertical direction, and said first and second spaces are formed coaxially with the axis of said solid electrolytic membrane means and a ventilation hole is made at a lowermost position of said hermetically sealed housing in the axial direction, and said first and second hermetically sealed spaces are placed at a lower side of said hermetically sealed housing in the axial direction, and said condensing space is communicated with said second space and is located at an uppermost section of said hermetically sealed housing in the axial direction.

16. A water evaporation type cooling system as defined in claim 12, wherein said solid electrolytic membrane means is made to have a cylindrical configuration and is disposed such that its axis takes the substantially vertical direction, and said first and second spaces are formed to be coaxial with the axis of said solid electrolytic membrane means, and further said first space is located inside said second space and a ventilation hole is made in a lowermost portion in the axial direction, and said condensing means is disposed at an outer circumferential portion of said second space so that said second hermetically sealed space serves as said condensing space.

17. A water evaporation type cooling system as defined in claim 12, wherein a gas consisting of oxygen gas and steam is hermetically packed in said first and second spaces.

18. A water evaporation type cooling method using a hermetically sealed housing including a gas and divided into first and second spaces by solid electrolytic membrane means having porous electrodes on surfaces of its solid high polymer electrolyte which allows protons to selectively pass, comprising the steps of:

applying a direct-current voltage to between said porous electrodes to cause water electrolysis on a solid electrolytic membrane means surface at a first space side;

transferring protons produced by the water electrolysis through said solid electrolytic membrane means to a solid electrolytic membrane means surface at a second space side; and causing a water production reaction to take place on said solid electrolytic membrane surface at the second space side to produce a difference in humidity between said first and second spaces to decrease the temperature of water reservoired in said first space.

19. A water evaporation type cooling method as defined in claim 18, wherein a high-humidity gas within said second space is condensed to produce condensed water and the condensed water is returned to said first space to add it to the water reservoired within said first space.

20. A water evaporation type cooling method as defined in claim 18, wherein a ventilation hole is provided to set up a communication between said first and second spaces so that oxygen gas produced by the electrolysis of water on a solid electrolytic membrane surface at a first space side is returned through said ventilation hole to said second space.

* * * * *